United States Patent
Hiasa et al.

(10) Patent No.: US 9,681,042 B2
(45) Date of Patent: Jun. 13, 2017

(54) IMAGE PICKUP APPARATUS, IMAGE PICKUP SYSTEM, IMAGE PROCESSING DEVICE, AND METHOD OF CONTROLLING IMAGE PICKUP APPARATUS

(71) Applicant: CANON KABUSHIKI KAISHA, Tokyo (JP)

(72) Inventors: Norihito Hiasa, Utsunomiya (JP); Koshi Hatakeyama, Tokyo (JP); Kaoru Eguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 14/022,414

(22) Filed: Sep. 10, 2013

(65) Prior Publication Data
US 2014/0071305 A1 Mar. 13, 2014

(30) Foreign Application Priority Data
Sep. 12, 2012 (JP) .................. 2012-200093

(51) Int. Cl.
*H04N 5/232* (2006.01)
*H04N 5/225* (2006.01)
(Continued)

(52) U.S. Cl.
CPC ....... *H04N 5/23229* (2013.01); *H04N 5/2254* (2013.01); *H04N 5/23212* (2013.01);
(Continued)

(58) Field of Classification Search
CPC ...... G06T 2207/10052; G02B 6/29334; H04N 5/23212; H04N 5/23216; H04N 5/2254
See application file for complete search history.

(56) References Cited

U.S. PATENT DOCUMENTS 8,581,998 B2 11/2013 Ohno
8,704,916 B2 * 4/2014 Imai .................. H04N 5/23212
                                                         348/239
(Continued)

FOREIGN PATENT DOCUMENTS

CN 1710485 A 12/2005
CN 101806950 A 8/2010
(Continued)

OTHER PUBLICATIONS

Ren NG, "Fourier Slice Photography" Stanford University, (2005 ACM Trans. Graph. 24, 735-744).
(Continued)

*Primary Examiner* — Ngoc-Yen Vu
(74) *Attorney, Agent, or Firm* — Rossi, Kimms & McDowell LLP

(57) ABSTRACT

An image pickup apparatus (10) capable of generating a plurality of output images having different focus positions by reconstructing an input image, the image pickup apparatus includes an input image obtaining unit (100) configured to obtain the input image, an image processing unit (105) configured to generate a display image from the input image, and a display unit (106) configured to display the display image, and the image processing unit (105) obtains a focus control range in which a focus position is controllable, and generates the display image including information on the focus control range by using at least a part of the input image.

23 Claims, 18 Drawing Sheets

(51) Int. Cl.
  *G03B 13/00* (2006.01)
  *G02B 6/293* (2006.01)
(52) U.S. Cl.
  CPC  *G02B 6/29334* (2013.01); *G06T 2207/10052* (2013.01); *H04N 5/23216* (2013.01); *H04N 5/23293* (2013.01)

(56) References Cited

U.S. PATENT DOCUMENTS

| | | | |
|---|---|---|---|
| 8,995,785 B2* | 3/2015 | Knight | H04N 5/23293 382/275 |
| 9,013,477 B2 | 4/2015 | Schmeitz et al. | |
| 2005/0280733 A1 | 12/2005 | Imaizumi | |
| 2008/0131019 A1 | 6/2008 | Ng | |
| 2010/0128145 A1 | 5/2010 | Pitts et al. | |
| 2010/0209091 A1 | 8/2010 | Ogino | |
| 2012/0069235 A1 | 3/2012 | Imai | |
| 2012/0154651 A1 | 6/2012 | Ohno | |
| 2012/0154748 A1 | 6/2012 | Inoue | |
| 2012/0182393 A1 | 7/2012 | Yagi | |
| 2012/0287308 A1 | 11/2012 | Kojima et al. | |
| 2013/0222633 A1 | 8/2013 | Knight et al. | |
| 2013/0342526 A1* | 12/2013 | Ng | G06T 15/205 345/419 |
| 2014/0146201 A1* | 5/2014 | Knight | H04N 9/04 348/231.99 |
| 2014/0240463 A1* | 8/2014 | Pitts | H04N 5/23212 348/46 |
| 2015/0088547 A1* | 3/2015 | Balram | G06F 19/322 705/3 |
| 2015/0304544 A1* | 10/2015 | Eguchi | H04N 5/23212 348/346 |
| 2015/0304632 A1* | 10/2015 | Inoue | G06T 5/005 348/49 |
| 2015/0332468 A1* | 11/2015 | Hayasaka | G06T 7/0075 382/154 |
| 2016/0323501 A1* | 11/2016 | Eguchi | G03B 13/36 |

FOREIGN PATENT DOCUMENTS

| | | |
|---|---|---|
| CN | 102481097 A | 5/2012 |
| CN | 102547095 A | 7/2012 |
| JP | 2008135812 A | 6/2008 |
| JP | 4752031 B2 | 8/2011 |
| JP | 2012142918 A | 7/2012 |
| JP | 2012145840 A | 8/2012 |
| JP | 2013531309 A | 8/2013 |
| WO | 2006039486 A2 | 4/2006 |
| WO | 2008050904 A1 | 5/2008 |
| WO | 2012001568 A1 | 1/2012 |

OTHER PUBLICATIONS

Chinese Office Action issued in Chinese counterpart application No. CN2013104112139, dated Mar. 9, 2015 English translation provided.

Official Action issued in Japanese Appln. No. 2012-200093 mailed Mar. 8, 2016.

Office Action issued in JP2012-200093, mailed Nov. 4, 2015.

Office Action issued in Chinese Patent Application No. 201510681058.1 mailed Nov. 28, 2016. English translation provided.

Partial European Search Report issued in European Patent Application No. 13183858.3 mailed Apr. 26, 2017.

* cited by examiner

IMAGE PICKUP APPARATUS, IMAGE PICKUP SYSTEM, IMAGE PROCESSING DEVICE, AND METHOD OF CONTROLLING IMAGE PICKUP APPARATUS

BACKGROUND OF THE INVENTION

Field of the Invention

The present invention relates to an image pickup apparatus capable of generating a plurality of output images having different focus positions by reconstructing an input image.

Description of the Related Art

In recent years, there has been proposed an image pickup apparatus which calculates data obtained by an image pickup element and performs a digital image processing corresponding thereto so as to output various images. Japanese Patent No. 4752031 discloses an image pickup apparatus which simultaneously obtains a two-dimensional intensity distribution of a beam in an object space and angle information of the beam, that is, parallax information by the use of "Light Field Photography". The two-dimensional intensity distribution of the beam and the angle information of the beam are called a light field, and three-dimensional information of the object space may be obtained by obtaining the light field. By performing a reconstruction processing on an image using the obtained light field, it is possible to perform an image focus position control called refocusing, a viewpoint changing control, a field depth control, and the like.

Further, PCT International Publication No. WO2008/050904 discloses a configuration in which a light field is obtained by using a camera array and refocusing is performed.

However, in the image pickup apparatuses disclosed in Japanese Patent No. 4752031 and PCT International Publication No. WO2008/050904, a user may not recognize a refocusable range (refocusing range) when photographing an object or editing an image. For this reason, it is difficult for the user to photograph a desired object or to edit an image according to the intension of the user.

BRIEF SUMMARY OF THE INVENTION

The invention provides an image pickup apparatus, an image pickup system, and an image processing device that allows a user to easily recognize a refocusing range and provides a method of controlling an image pickup apparatus.

An image pickup apparatus as one aspect of the present invention is capable of generating a plurality of output images having different focus positions by reconstructing an input image, the image pickup apparatus includes an input image obtaining unit configured to obtain the input image, an image processing unit configured to generate a display image from the input image, and a display unit configured to display the display image, and the image processing unit obtains a focus control range in which a focus position is controllable, and generates the display image including information on the focus control range by using at least a part of the input image.

An image pickup system as another aspect of the present invention is capable of generating a plurality of output images having different focus positions by reconstructing an input image, the image pickup system includes an input image obtaining device configured to obtain an input image, an image processing device configured to generate a display image from the input image, and a display device configured to display the display image, the image processing device obtains a focus control range in which the focus position is controllable, and the image processing device generates the display image including information on the focus control range by using at least a part of the input image.

An image processing device as another aspect of the present invention is capable of generating a plurality of output images having different focus positions by reconstructing an input image, the image processing device includes a storage unit configured to store image pickup condition information of an input image, an image processing unit configured to generate a display image from the input image, and a display unit configured to display the display image, and the image processing unit obtains a focus control range in which the focus position is controllable, and generates the display image including information on the focus control range by using at least a part of the input image.

A method of controlling an image pickup apparatus as another aspect of the present invention is capable of generating a plurality of output images having different focus positions by reconstructing an input image, the method includes the steps of obtaining an input image via an imaging optical system and an image pickup element, obtaining a focus control range in which the focus position is controllable, generating a display image including information on the focus control range by using at least a part of the input image, and displaying the display image on a display unit.

Further features and aspects of the present invention will become apparent from the following description of exemplary embodiments with reference to the attached drawings.

DETAILED DESCRIPTION OF THE PREFERRED EMBODIMENTS

Figure 1:
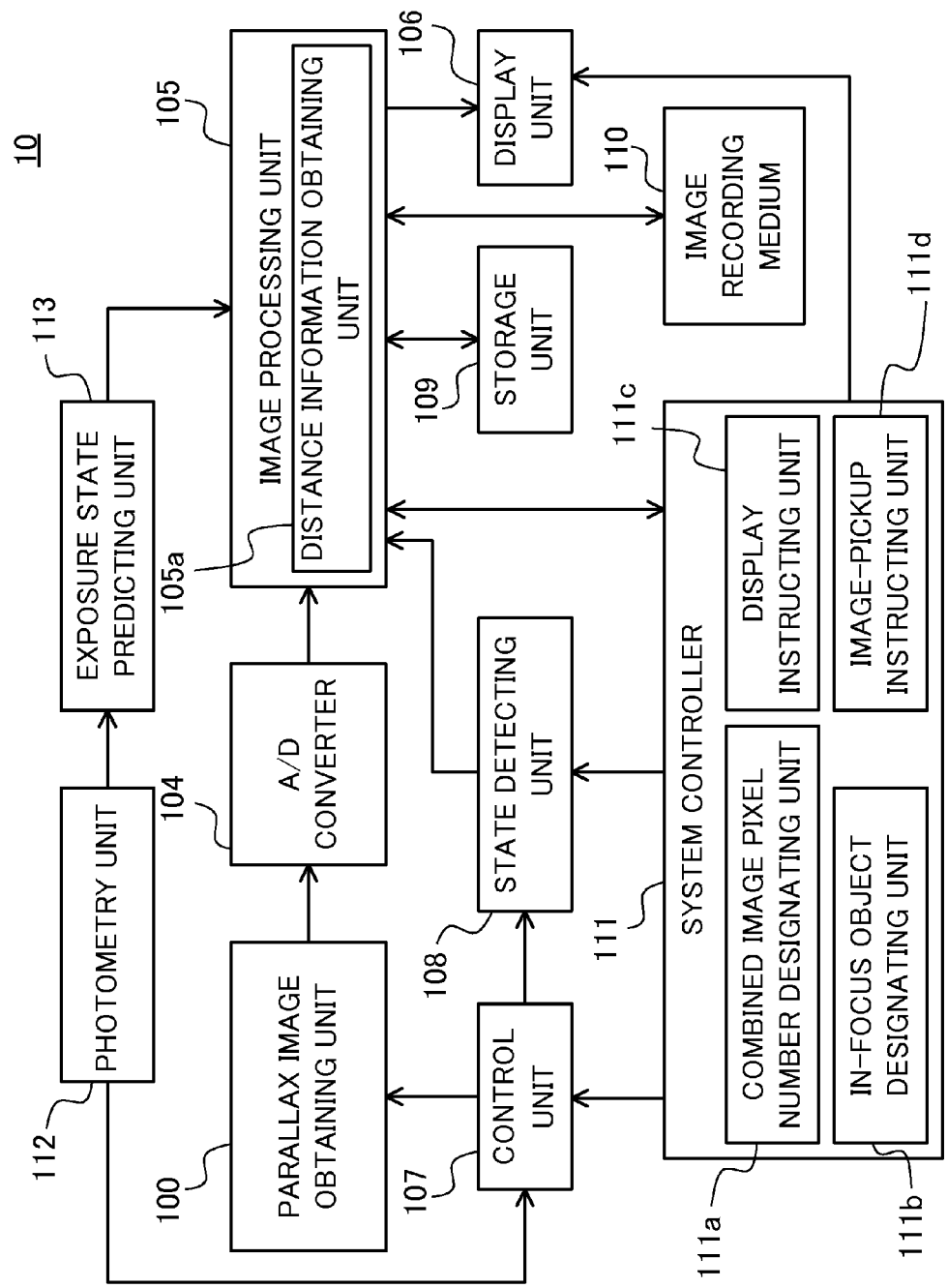
FIG. 1 is a block diagram illustrating an image pickup apparatus of Embodiments 1 to 3.

Exemplary embodiments of the present invention will be described below with reference to the accompanied drawings. In the respective drawings, the same reference numerals will be given to the same components, and the description thereof will be omitted.

Figure 2:
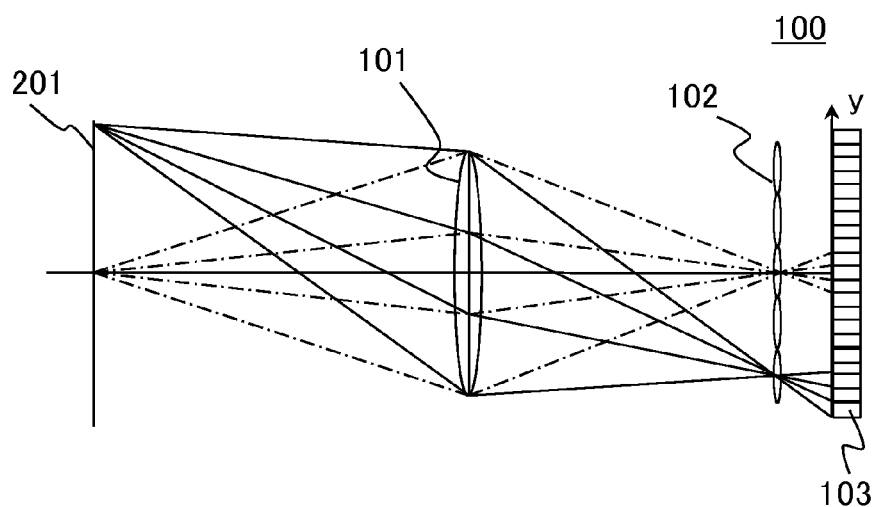
FIG. 2 is a schematic configuration diagram illustrating a parallax image obtaining unit of Embodiment 1.
Figure 3:
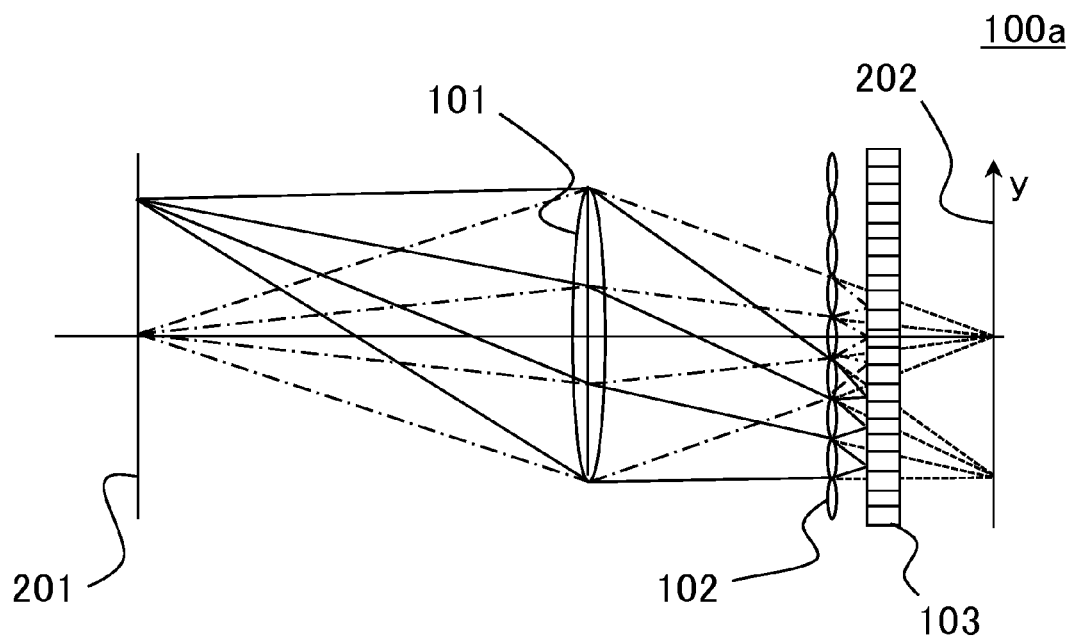
FIG. 3 is a schematic configuration diagram illustrating a parallax image obtaining unit of Embodiment 2.
Figure 4:
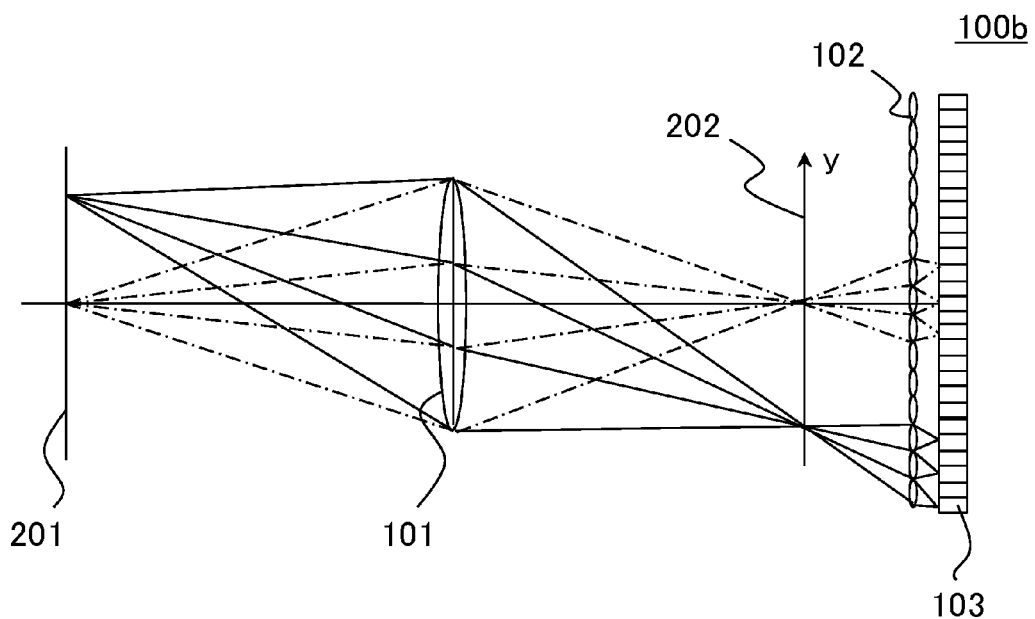
FIG. 4 is a schematic configuration diagram illustrating a different parallax image obtaining unit of Embodiment 2.
Figure 5:
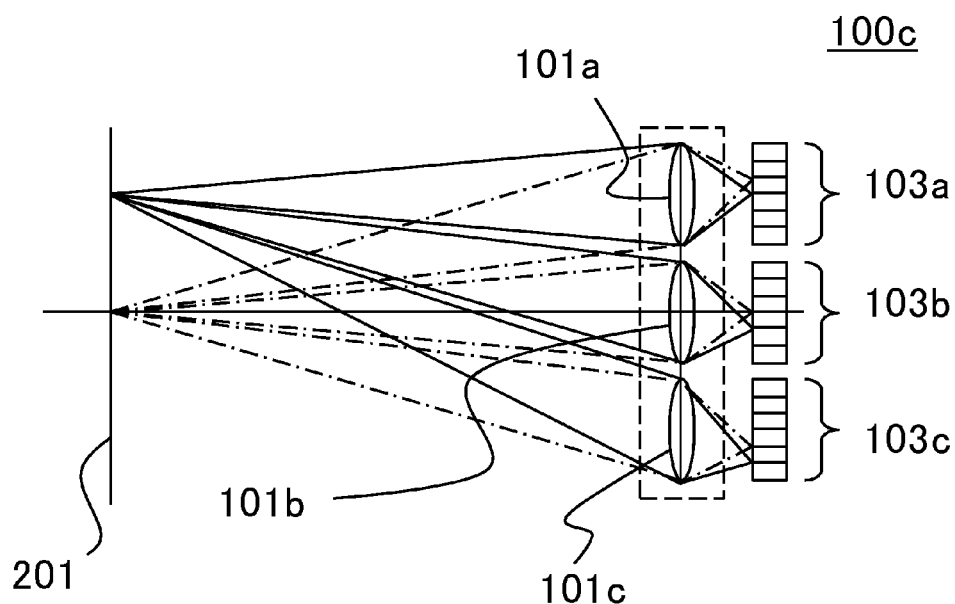
FIG. 5 is a schematic configuration diagram illustrating a parallax image obtaining unit of Embodiment 3.

An image pickup apparatus of the embodiment is an image pickup apparatus capable of generating a plurality of output images having different focus positions by reconstructing an input image. A parallax image obtaining unit (input image obtaining unit) of the embodiment obtains a parallax image (input image), that is, a light field which is obtained by photographing an object space from a plurality of viewpoints. As an example of the parallax image obtaining unit of the embodiment, exemplified is a configuration in which a lens array is disposed on an image side of an imaging optical system as illustrated in FIGS. 2 to 4 or a configuration in which a plurality of imaging optical systems are arranged as illustrated in FIG. 5. Meanwhile, as a method of obtaining the parallax image (light field), a method is considered in which a photographing operation is performed a plurality of times while changing the position of the image pickup apparatus by the use of the image pickup apparatus including an imaging optical system and an image pickup element. The parallax image which is obtained by such a method is an image obtained by capturing the object space at different time points. For this reason, when a moving object exists in the object space, correct parallax information may not be obtained. Accordingly, it is desirable to employ a configuration in which the parallax image obtaining unit may obtain the entire parallax image (a plurality of parallax images) at the same time as illustrated in FIGS. 2 to 5.

By performing a pixel extracting processing, a sequence rearranging processing, or a combination processing on the parallax image obtained by the configurations of FIGS. 2 to 5, a refocusing or field depth control, a viewpoint changing control, and the like may be performed. In the embodiment, such a processing (a processing for obtaining an output image using at least a part of an input image) is called a reconstruction processing. Further, an image which is generated by the reconstruction processing is called a reconstruction image (output image). In particular, an image (output image) obtained by performing the refocus processing on the parallax image is called a combined image. The combined image may be obtained by a noise reduction processing or a reconstruction processing such as a field depth control. Further, a refocusable range, that is, a range in which the focus position may be controlled in the object space is called a focus control range (refocusing range). As will be described later, the focus control range is obtained by an image processing unit. Further, the image processing unit generates a display image including information involving with the focus control range by using at least a part of the input image.

In the embodiment, a person or an object may not be essentially present on an object plane 201 of FIGS. 2 to 5. This is because the focus position may be controlled so as to focus on a person or an object present at the inner side or the front side of the object plane 201 by the refocus processing (reconstruction processing) performed after the photographing operation. Furthermore, in the respective embodiments below, a one-dimensional system may be used for the simplicity of description, but the same may be applied to a two-dimensional system in the respective embodiments.

[Embodiment 1]

First, an image pickup apparatus of Embodiment 1 of the invention will be described. FIG. 1 is a block diagram illustrating an image pickup apparatus 10 of the embodiment. FIG. 2 is a schematic configuration diagram illustrating a parallax image obtaining unit (input image obtaining unit) 100 of the image pickup apparatus 10.

As illustrated in FIG. 2, the parallax image obtaining unit 100 includes an imaging optical system 101, a lens array 102, and an image pickup element 103 in order from an object side (object plane side). The imaging optical system 101 forms an image of the beam coming from the object plane 201 on an image-side conjugate plane. The lens array 102 is disposed on the image-side conjugate plane. An image pickup element 103 includes a plurality of pixels. Further, the lens array 102 is configured to cause a beam coming from the same position of the object plane 201 to enter different pixels of the image pickup element 103 in accordance with the pupil region of the imaging optical system 101 through which the beam passes.

With such a configuration, the parallax image obtaining unit 100 obtains a parallax image (input image). The image pickup element 103 is a two-dimensional image pickup element such as a CCD (Charge Coupled Device) or a CMOS (Complementary Metal-Oxide Semiconductor). The energy of the beams which pass through the imaging optical system 101 and the lens array 102 and are incident to the image pickup element 103 is converted into an analog electric signal (analog signal) by the photoelectric conversion of the image pickup element 103. An A/D converter 104 converts the analog signal into a digital signal and outputs the digital signal to an image processing unit 105. The image processing unit 105 generates a display image by applying a predetermined processing on the digital signal. The display image which is generated by the image processing unit 105 is output to a display unit 106 such as a liquid crystal display so as to be displayed thereon. The user sees the display image of the display unit 106, and hence may perform a photographing operation while checking the image.

The image processing unit 105 uses an image obtaining condition, information obtained from an exposure state predicting unit 113 or a storage unit 109, information obtained from a distance information obtaining unit 105a, and the like when generating the display image. Here, the image obtaining condition includes information on the parallax image obtaining unit 100 when obtaining the analog signal (parallax image) (information on the configuration of the parallax image obtaining unit 100), an exposure state of an aperture, a focus position, a focus distance of a zoom lens, and the like. A state detecting unit 108 may directly obtain the image obtaining condition from a system controller 111. Further, the information on the parallax image obtaining unit 100 may be also obtained from a control unit 107. In the embodiment, the information on the configuration of the parallax image obtaining unit 100 is stored in the storage unit 109. The exposure state predicting unit 113 predicts the exposure state in advance based on the information obtained from the photometry unit 112. The image processing unit 105 changes the focus control range in accordance with the exposure state that is predicted in advance. Further, the distance information obtaining unit 105*a* in the image processing unit 105 obtains the distance information of the object space from the input parallax information (parallax image).

The system controller 111 includes a display instructing unit 111*c* that instructs the display of the display image on the display unit 106. The display unit 106 turns on and off the display and switches the display image in accordance with the signal output from the display instructing unit 111*c*. For example, in a case where the image pickup apparatus 10 is equipped with a release button, the display instructing unit 111*c* outputs a predetermined signal so that the display image is displayed on the display unit 106 while the user pushes the release button to a first position (before the photographing operation is performed). When the release button is pushed to a second position deeper than the first position in this state, the photographing operation is performed. However, the embodiment is not limited thereto, and the display instructing unit 111*c* may transmit a signal by another method.

Further, the system controller 111 includes an in-focus object designating unit 111*b* which designates an object that is to be focused by the parallax image obtaining unit 100. In accordance with the signal output from the in-focus object designating unit 111*b*, the control unit 107 drives a focusing mechanism of the parallax image obtaining unit 100 so as to perform a focus-in control on the object (designated object). When the photographing operation is performed by an image-pickup instructing unit 111*d*, the control unit 107 adjusts the exposure of the parallax image obtaining unit 100 based on the information from the photometry unit 112. At this time, the image which is obtained by the image pickup element 103 is input to the image processing unit 105 so that a predetermined processing is performed on the image as described above. Then, the image is recorded on an image recording medium 110 (image recording unit) such as a semiconductor memory in a predetermined format. Also, the image obtaining condition which is obtained from the state detecting unit 108 during the photographing operation is also recorded on the image recording medium 110. The image which is recorded on the image recording medium 110 may be an image subjected to the reconstruction processing. In this way, the image recording medium 110 records at least a part of the parallax image (input image) or the reconstruction image (output image). Further, the image recording medium 110 records not only at least a part of the parallax image or the reconstruction image (image) but also the focus control range corresponding to the recorded image.

In a case where the image recorded on the image recording medium 110 is displayed on the display unit 106, the image processing unit 105 performs a processing on the image based on the image obtaining condition during the photographing operation. As a result, the display unit 106 displays an image (reconstruction image) that is reconstructed by the desired settings (the number of pixels, the viewpoint, the focus position, the field depth, and the like). The number of pixels of the reconstruction image is designated by a combined image pixel number designating unit (pixel number designating unit) 111*a*. Further, in order to increase the processing speed, a configuration may be employed in which the desired settings are stored in the storage unit 109 in advance and the reconstruction image is displayed on the display unit 106 without using the image recording medium 110. The above-described series of control is performed by the system controller 111.

Next, referring to FIG. 2, the configuration of the parallax image obtaining unit 100 of the embodiment will be described. The lens array 102 is disposed on the image-side conjugate plane of the imaging optical system 101 with respect to the object plane 201. Further, the lens array 102 has a configuration in which a conjugate relation is substantially set between the exit pupil of the imaging optical system 101 and the image pickup element 103. Here, the substantial conjugate relation indicates not only the precise conjugate relation but also a relation (substantially conjugate relation) that is substantially evaluated as the conjugate relation. The beam coming from the object plane 201 enters the plurality of different pixels of the image pickup element 103 in accordance with the angle and the position of the beam on the object plane 201 through the imaging optical system 101 and the lens array 102. With such a configuration, the light field is obtained. Here, the lens array 102 serves to prevent the beams passing through different positions on the object plane 201 from being incident to the same pixel of the image pickup element 103. As a result, an image is obtained by arranging pixel groups in which the same region on the object plane 201 is photographed by the image pickup element 103 from a plurality of viewpoints.

Figure 6:
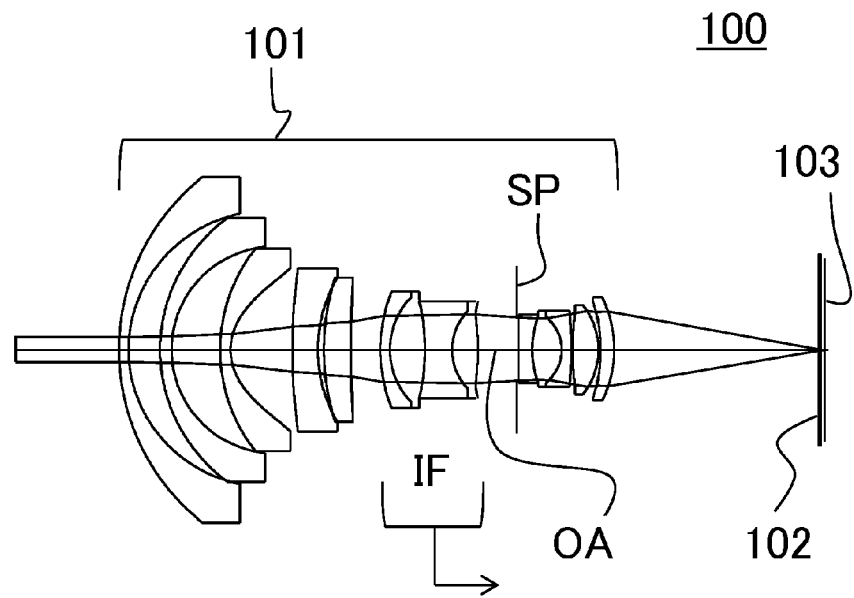
FIG. 6 is a cross-sectional view illustrating the parallax image obtaining unit of Embodiment 1.

FIG. 6 is a cross-sectional view illustrating the parallax image obtaining unit 100 of the embodiment. In FIG. 6, the imaging optical system 101 is a single focus lens (a fixed focal length lens). A focus group IF moves on the optical axis OA so as to perform the focusing operation. An aperture SP controls the exposure state. The lens array 102 is formed as a single solid lens in the embodiment, but the invention is not limited thereto. The lens array 102 may include a plurality of lenses, and may be formed by using a liquid lens, a liquid crystal lens, a diffraction optical element, or the like. Further, in the embodiment, the small lens forming the lens array 102 has a convex shape on both surfaces thereof, but the invention is not limited thereto. For example, one surface may be formed in a planar shape or a non-spherical shape.

Further, it is desirable that the plane on the image side (the side of the image pickup element 103) of the small lens forming the lens array 102 has a convex shape. Accordingly, the astigmatism of the lens array 102 is reduced, and hence the image obtained on the image pickup element 103 becomes sharp. On the contrary, in a case where the image-side plane is not formed in a convex shape, the astigmatism increases, and hence the periphery of the image formed by the respective small lenses is blurred. When the blurred portion of the image is used in the reconstruction processing, the sharp reconstruction image may not be obtained. Further, it is more desirable that the plane on the object side (the side of the imaging optical system 101) of the small lens have a planar shape or a convex shape. Accordingly, the curvature of the small lens is low and the aberration is reduced. Thus, the sharpness of the image may be further improved.

Subsequently, the refocus processing of the embodiment will be described. Since the refocusing is described in detail in "Fourier Slice Photography" (refer Ren Ng, 2005 ACM Trans. Graph. 24, 735-744), the refocusing will be simply described herein. The basic principle of the refocusing is common in any configuration illustrated in FIGS. 2 to 5. Here, this will be described by exemplifying the configuration of FIG. 2.

In FIG. 2, since the pupil of the imaging optical system 101 is divided into nine segments in two dimensions (three segments in one dimension), a nine-viewpoint image is obtained. Here, the image corresponding to a certain divided pupil is called a single-viewpoint image. Since nine single-viewpoint images have a parallax difference, the relative positional relation of the object on the image changes in accordance with the object distance. When the single-viewpoint images are combined with one another so that certain objects are superimposed on (overlapped with) one another, the objects positioned at different object distances are combined with one another in a misaligned state. Due to this misalignment, the object positioned at a different object distance is blurred. The blurring at this time is defined by the pupils corresponding to the single-viewpoint images used for the combination, and when all nine images are combined with one another, the blurring of the image captured by the imaging optical system 101 may be reproduced. Since the objects superimposed on one another by the combination of the single-viewpoint images are arbitrarily set, an image captured by focusing an arbitrary object in the imaging optical system 101 may be reproduced. This is the principle of the focus control, that is, the refocusing after the photographing operation.

Figure 7:
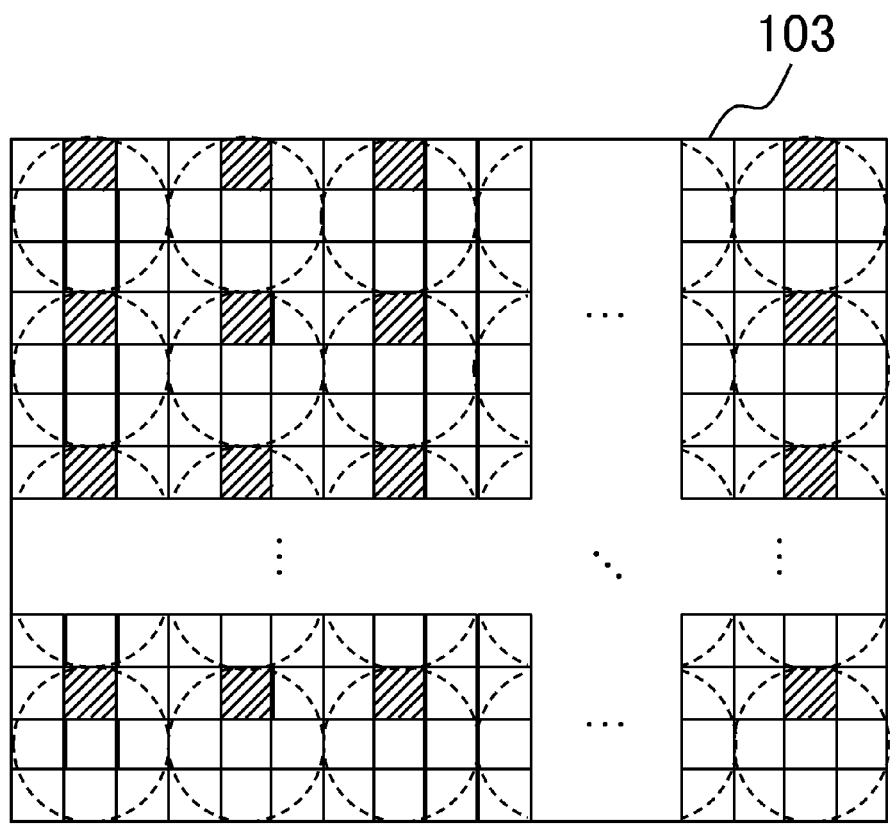
FIG. 7 is an explanatory diagram illustrating the generation of a refocusing image of Embodiment 1.

Subsequently, a method of generating the single-viewpoint image of the embodiment will be described. FIG. 7 is an explanatory diagram illustrating the generation of the refocusing image in the embodiment and is a diagram illustrating a relation between the lens array 102 and the image pickup element 103 of FIG. 2. The dashed circle of FIG. 7 indicates a region into which the beam passing through one small lens is incident. FIG. 7 indicates a case where the small lenses are arranged in a lattice shape, but the arrangement of the small lenses is not limited thereto. For example, the small lenses may be arranged with six-fold symmetry or the respective small lenses may be slightly shifted from the regular arrangement. In FIG. 7, the diagonal line portion indicates the pixel into which the beam passing through the same pupil region of the imaging optical system 101 is incident. For this reason, it is possible to generate the single-viewpoint image in which the object space is viewed from the lower portion of the pupil of the imaging optical system 101 by extracting the pixel of the diagonal line portion. Similarly, it is possible to also generate the other single-viewpoint images by extracting the pixels of which the relative positions with respect to the respective circles depicted by the dashed line are the same.

Next, the focus control range (refocusing range) in which the refocusing may be performed will be described. Since the refocusing is performed by superimposing the single-viewpoint images on one another, it is not possible to refocus the object that is blurred in the respective single-viewpoint images again. This is because the high-frequency component may not be obtained and the images are still blurred even when the blurred images are superimposed on one another. That is, the focus control range is dependent on the divided pupils of the imaging optical system 101. Since the field depths of the respective single-viewpoint images become deeper as the pupil is divided into more segments, the focus control range is widened. However, the field depth of the single-viewpoint image does not essentially match the focus control range. This is because the focus control range changes in accordance with the pixel number ratios of the single-viewpoint images and the combined image obtained by the combination of these images. For example, when the number of pixels of the combined image is smaller than the number of pixels of the images of the respective viewpoints, the sampling pitch of the spatial component of the combined image increases with respect to the single-viewpoint image. For this reason, the field depth of the combined image becomes deeper than those of the single-viewpoint images, and hence the focus control range thereof is also widened. On the contrary, when the number of pixels of the combined image is larger than those of the single-viewpoint images, the focus control range becomes smaller than the field depth of the single-viewpoint image. Here, as a method of further increasing the number of pixels of the combined image more than those of the single-viewpoint images, a method of using super-resolution by the pixel shift is considered. As described above, the refocusing is performed by combining the single-viewpoint images in a shifted state. When the shift amount at this time is non-integer times the pixel pitch of the single-viewpoint image, the revolution may be enhanced by the pixel shift, and hence the revolution may be enhanced. For this reason, the number of pixels of the combined image may be enhanced.

From the discussion so far, it is understood that the condition for combining the single-viewpoint images needs to be additionally used in order to obtain the accurate focus control range of the combined image. Further, the field depth of the single-viewpoint image changes in accordance with the viewing angle. This is because the F valve changes in accordance with the viewing angle due to the vignetting of the imaging optical system 101. For this reason, the user may recognize the more accurate value by calculating the focus control range in accordance with the viewing angle.

Figure 8:
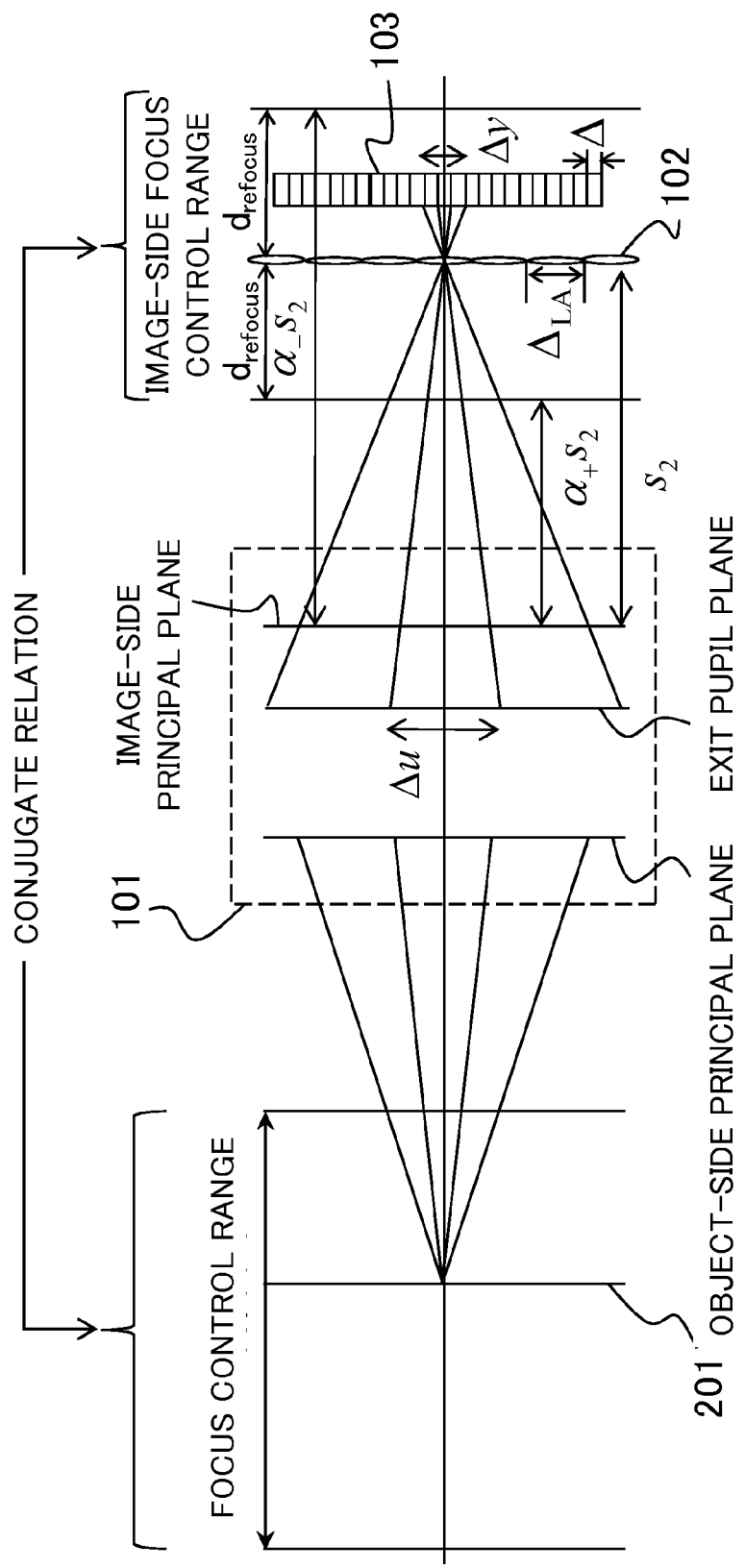
FIG. 8 is an explanatory diagram illustrating a focus control range of Embodiment 1.

Subsequently, referring to FIG. 8, a method of calculating the focus control range of the combined image will be described. FIG. 8 is an explanatory diagram illustrating the focus control range of the embodiment. First, the focal depth corresponding to the field depth of the combined image is considered. Here, the size of the allowable confusion circle of the focal depth is denoted by $\epsilon$ and the sampling pitch of the angular component of the beam is denoted by $\Delta u$. At this time, the refocusing coefficient $\alpha_\pm$ is given as Expression (1) below.

$$\alpha_\pm = \frac{1}{1 \pm \epsilon/\Delta u} \quad (1)$$

As illustrated in FIG. 8, a range conjugate to the image-side refocusing range $\alpha_+ S_2 \sim \alpha_- S_2$ (image-side focus control range) represented by Expression (1) with respect to the imaging optical system 101 is a focus control range as the object-side refocusing range. Here, $S_2$ indicates a distance between the image-side principal plane of the imaging optical system 101 and the image-side conjugate plane (lens array 102) of the imaging optical system 101 with respect to the object plane 201. The relation of Expression (1) is satisfied in any configuration of FIGS. 2 to 5. Here, the image-side focus control range indicates the focus control range (refocusing range) and the conjugate range through the imaging optical system 101. Further, $\Delta y$ indicates the sampling pitch of the two-dimensional intensity distribution of the beam, and is the same as the pitch $\Delta_{LA}$ of the lens array 102 in the configuration of FIG. 2. The pixel pitch $\Delta$ of the image pickup element 103 is sufficiently small with respect to the exit pupil distance P of the imaging optical system 101. For this reason, Expression (1) may be approximated to Expression (2) below.

$$\alpha_\pm s_2 = s_2 \mp NF\epsilon \qquad (2)$$

Here, the exit pupil distance P of the imaging optical system 101 indicates a distance between the exit pupil plane of the imaging optical system 101 and the image-side conjugate plane (lens array 102) of the imaging optical system 101 with respect to the object plane 201. Further, N indicates the number of one-dimensional divided segments of the pupil of the imaging optical system 101, and F indicates the F number of the imaging optical system 101.

Figure 9:
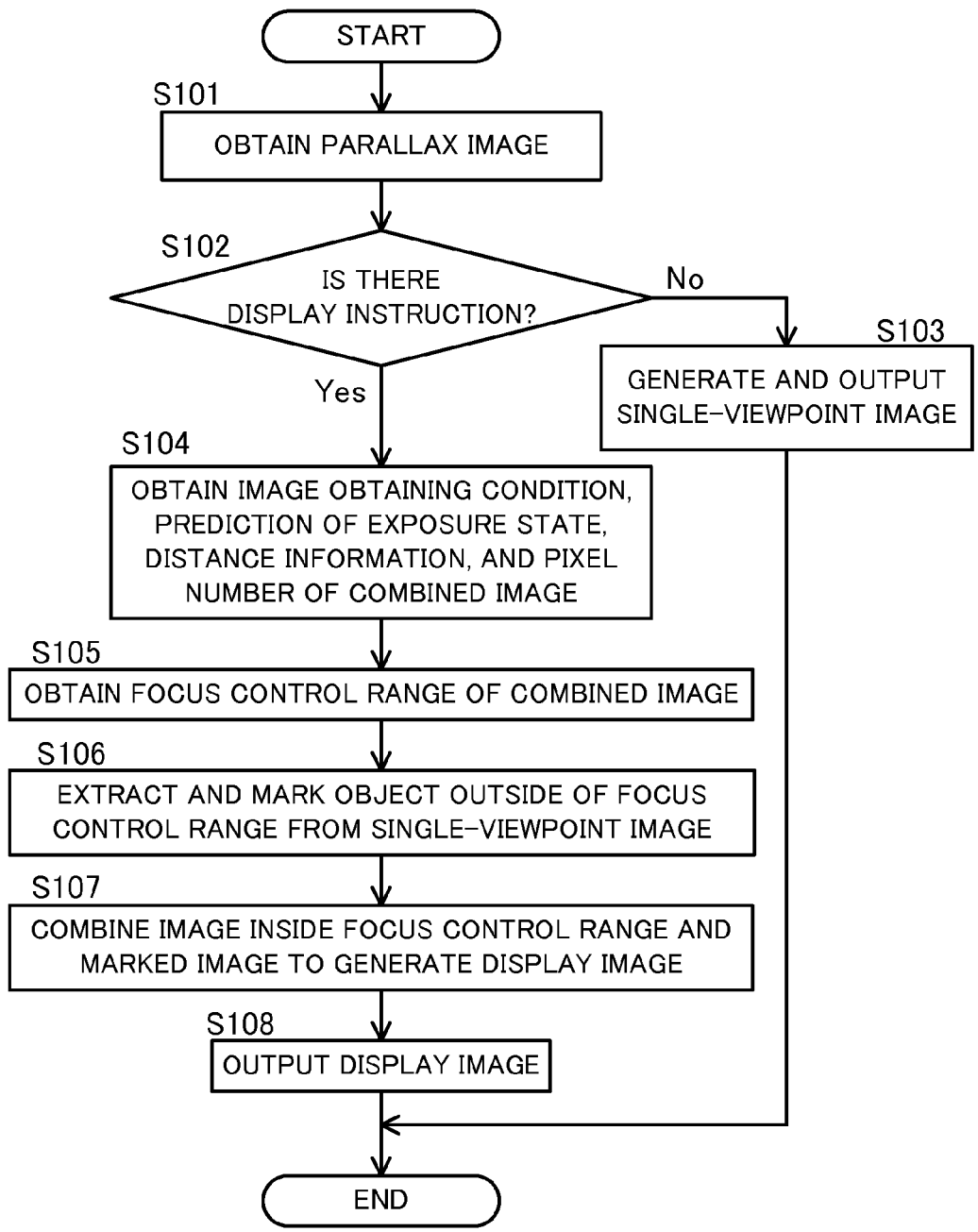
FIG. 9 is a flowchart illustrating a case where a focus control range is offered to a user when a photographing operation is performed (before a photographing operation is performed) in Embodiments 1 to 4.
Figure 10:
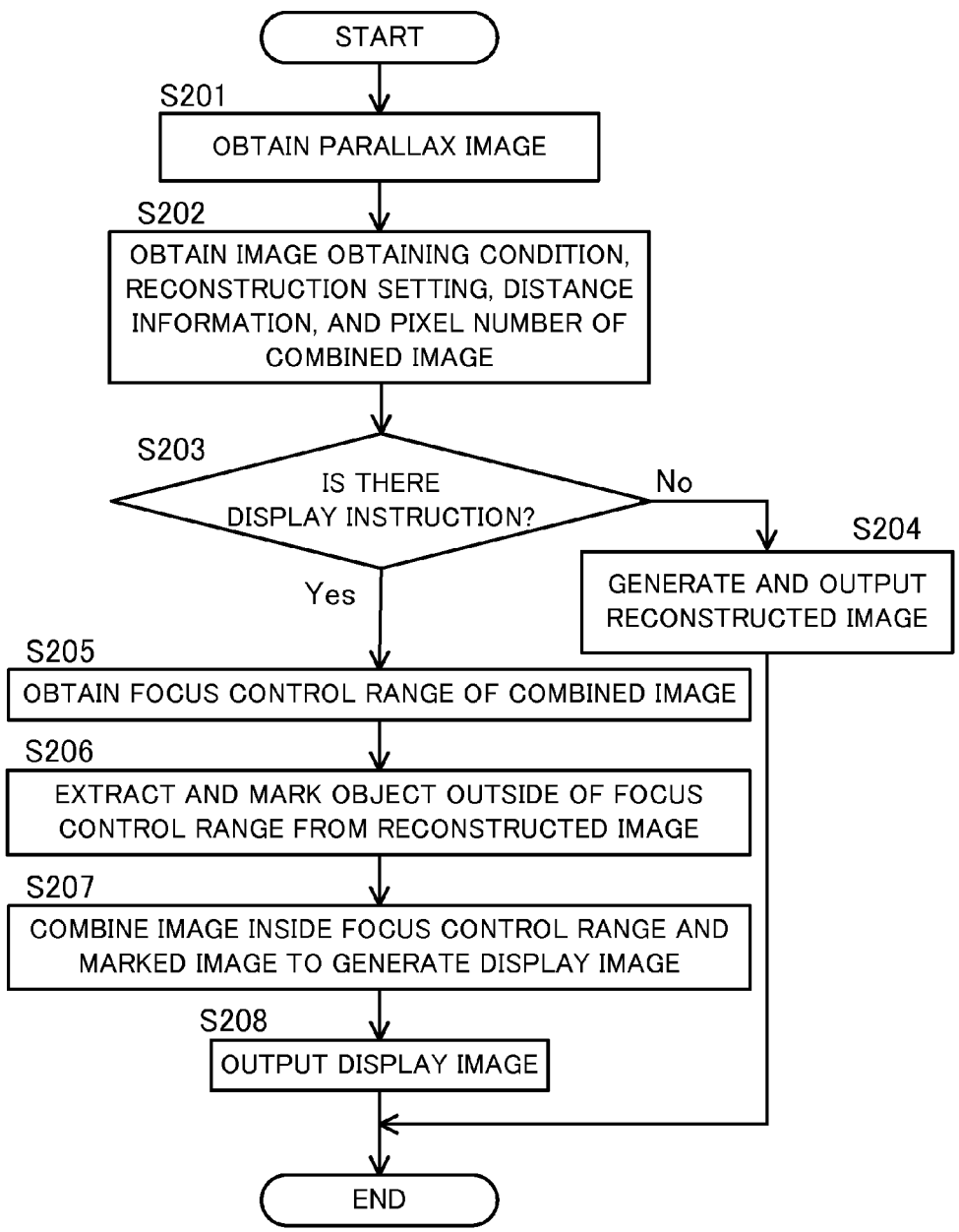
FIG. 10 is a flowchart illustrating a case where a focus control range is offered to a user when an image is edited in Embodiments 1 to 4.

Next, referring to FIGS. 9 and 10, a processing of suggesting the focus control range of the embodiment to the user will be described. FIG. 9 is a flowchart in a case where the focus control range is suggested to the user when the photographing operation is performed (before the photographing operation is performed). FIG. 10 is a flowchart in a case where the focus control range is suggested to the user when the image is edited. In FIGS. 9 and 10, steps S105 and S205 respectively indicate the focus control range obtaining steps, and steps S106 and S107 and steps S206 and S207 respectively indicate the display image generating steps. Furthermore, the respective steps in FIGS. 9 and 10 are performed by the image processing unit 105 based on the instruction of the system controller 111.

First, referring to FIG. 9, a case will be described in which the focus control range is suggested to the user when the photographing operation is performed. Here, the image (the image including the information on the focus control range) on which the focus control range is displayed is called the display image. In step S101 of FIG. 9, the image processing unit 105 obtains the parallax image in a manner such that the parallax image which is obtained by the parallax image obtaining unit 100 is input to the image processing unit 105.

Subsequently, in step S102, the image processing unit 105 determines whether the display instruction of the display image is generated. For example, in a case where the image pickup apparatus 10 is equipped with a switch for displaying the focus control range, the display instruction is output from the display instructing unit 111c when the switch is pushed by the user. However, the display instruction is not limited thereto, and the display instruction may be generated by another method. When the image processing unit 105 receives the display instruction, the routine proceeds to step S104. Meanwhile, when the image processing unit does not receive the display instruction, the routine proceeds to step S103.

In this way, the image processing unit 105 generates the display image after the object to be focused is designated. However, the embodiment is not limited thereto, and the display instruction may be interlocked with the in-focus object designating unit 111b. For example, the display instruction may be output at the same time when the user designates the in-focusing object (the object to be focused). Accordingly, it is possible to suggest the focus control range only in a state the user wants to photograph an object by decreasing the number of useless processes. Further, in the embodiment, the display image on which the focus control range is displayed may be output at all times by skipping step S102 and directly proceeding from step S101 to step S104.

When the image processing unit 105 does not receive the display instruction in step S102, the image processing unit generates the single-viewpoint image of the viewpoint closest to the pupil center of the imaging optical system 101 of the parallax image and outputs the single-viewpoint image to the display unit 106 in step S103. Accordingly, the user may check the image currently obtained by the image pickup element 103 in real time on the display unit 106. The output image to the display unit 106 is the single-viewpoint image obtained by a simple processing, but the embodiment is not limited thereto. For example, the reconstruction image may be output. Further, when the single-viewpoint image is output, the viewpoint may be set to an arbitrary position of the pupil of the imaging optical system 101.

Meanwhile, when the image processing unit 105 receives the display instruction in step S102, the image processing unit obtains information for generating the display image in step S104. The information for generating the display image includes the image obtaining condition of the parallax image input through the parallax image obtaining unit 100 in step S101, the exposure state predicting result during the photographing operation, the distance information of the object space, the number of pixels of the combined image, and the like. Here, the distance information of the object space is calculated based on the parallax information of the input parallax image. However, the distance information may be obtained by using a method such as a DFD (Depth From Defocus) or a distance measuring unit using an infrared ray or the like. Further, step S104 may be performed before step S102.

Subsequently, in step S105, the image processing unit 105 obtains the focus control range of the combined image by using the information obtained in step S104. As described above, the focus control range changes in accordance with the pixel number ratio between the respective single-viewpoint images and the combined image. For this reason, the image processing unit 105 changes the focus control range in accordance with the information obtained in step S104. Here, a case in which the pixel number ratio is 1 will be first considered for the simplicity of description.

When the image-side focus control range falls within the range of Expression (2), a region is obtained in which the refocusing may be performed. For this reason, the distance $d_{refocus}$ between the image-side conjugate plane (lens array 102) of the imaging optical system 101 with respect to the object plane 201 and one of both ends of the image-side focus control range may satisfy Expression (3) below.

$$d_{refocus} \leq NF\epsilon \qquad (3)$$

Figure 11:
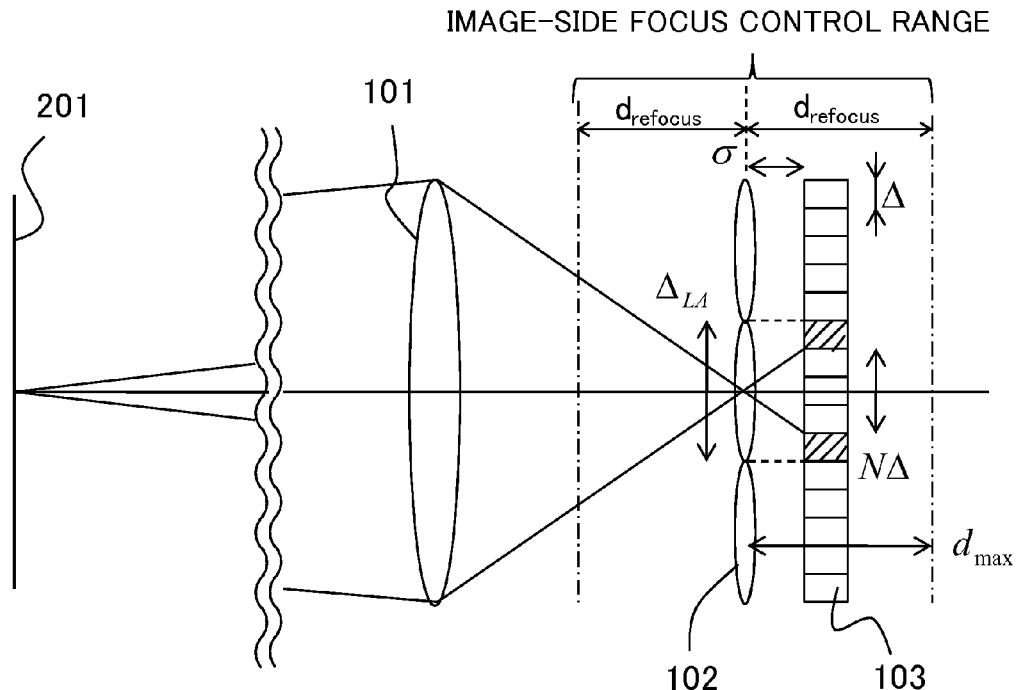
FIG. 11 is an explanatory diagram illustrating an optical arrangement of the parallax image obtaining unit of Embodiment 1.

FIG. 11 is an explanatory diagram illustrating the optical arrangement of the parallax image obtaining unit 100, and illustrates a relation of respective parameters in the configuration of FIG. 2. From FIG. 11, it is understood that the relation of $NF=\sigma/\Delta$ is satisfied. σ indicates a distance between the image-side principal plane of the lens array 102 and the image pickup element 103. The dashed line of FIG. 11 indicates a region of the image pickup element 103 corresponding to one small lens. Further, the pixel of the diagonal line portion indicates a dead zone into which the beam is not incident. In the embodiment, the lens array 102 is configured so that the dead zone does not occur in the image pickup element 103, and in this case, the relation of $\Delta_{LA}=N\Delta$ is established. However, the embodiment is not limited thereto, and the dead zone may exist in the image pickup element 103.

When the size of the allowable confusion circle for defining the focal depth is specified as the sampling pitch $\Delta y = \Delta_{LA}$ of the spatial component, Expression (3) may be re-expressed as Expression (4) below.

$$\frac{d_{refocus}}{NF\Delta_{LA}} = \frac{d_{refocus}\Delta}{\Delta_{LA}\sigma} \leq \frac{\varepsilon}{\Delta_{LA}} \qquad (4)$$

Next, a general case will be considered in which the pixel number ratios of the single-viewpoint image and the combined image are different. The viewing angle of the combined image is the same as the viewing angle of the single-viewpoint image used for the combination. For this reason, in a case where the pixel number ratios are different, both sampling pitches $\Delta y$ are different from each other. In general, the allowable confusion circle becomes smaller as the sampling pitch $\Delta y$ becomes smaller and becomes larger as the sampling pitch becomes larger. For this reason, Expression (4) may be extended to Expression (5) below by adopting the ratio of the sampling pitch $\Delta y$ between the single-viewpoint image and the combined image.

$$\frac{d_{refocus}\Delta}{\Delta_{LA}\sigma} \leq \frac{\varepsilon}{\Delta_{LA}}\sqrt{\frac{R_{mono}}{R_{synth}}} \qquad (5)$$

Here, $R_{mono}$ indicates the number of pixels of the single-viewpoint image used for the combination and $R_{synth}$ indicates the number of pixels of the combined image. By adopting the square root of the ratio between $R_{mono}$ and $R_{synth}$, the ratio of $\Delta y$ is obtained.

From FIG. 11, it is understood that the number of pixels $R_{mono}$ of the single-viewpoint image is expressed as Expression (6) below.

$$R_{mono} = \left(\frac{\Delta}{\Delta_{LA}}\right)^2 R_{total} \qquad (6)$$

Here, $R_{total}$ indicates the number of effective pixels of the image pickup element 103.

From Expression (5) and Expression (6), the conditional expression to be satisfied by the image-side focus control range is obtained as Expression (7) below.

$$0.0 < \frac{d_{refocus}}{\sigma}\sqrt{\frac{R_{synth}}{R_{total}}} \leq 10.0 \qquad (7)$$

By determining the image-side focus control range in the range of Expression (7), a range may be obtained in which the refocusing may be performed after the photographing operation. Theoretically, Expression (7) may not take a negative value. Further, since the case where Expression (7) is 0 indicates that the focus control may not be performed, the value does not exceed the lower limit of Expression (7). The upper limit of Expression (7) indicates the enlarged dotted image at the focus position of the combined image, and the sharper refocusing may be performed as the upper limit becomes smaller. When the value exceeds the upper limit of Expression (7), the magnification of the dotted image increases, and hence the blurring occurs even at the focus position. That is, the refocusing may not be performed in this case.

Desirably, the sharper combined image may be obtained by setting the image-side focus control range within the range of Expression (7a) below.

$$0.0 < \frac{d_{refocus}}{\sigma}\sqrt{\frac{R_{synth}}{R_{total}}} \leq 6.0 \qquad (7a)$$

Desirably, the sharper in-focusing image may be obtained by setting the image-side focus control range within the range of Expression (7b) below.

$$0.0 < \frac{d_{refocus}}{\sigma}\sqrt{\frac{R_{synth}}{R_{total}}} \leq 3.0 \qquad (7b)$$

The value of Expression (7) of the embodiment is illustrated in Table 1. Further, in the embodiment, the number of effective pixels of the image pickup element 103 is set as $R_{total}=46.7\times10^6$ (pix), and the distance between the image-side principal plane of the lens array 102 and the image pickup element 103 is set as $\sigma=0.0374$ (mm). Here, pix indicates the unit representing the number of pixels. The pixel pitch of the image pickup element 103 is set as $\Delta=0.0043$ (mm), and the pitch of the lens array 102 is set as $\Delta_{LA}=0.0129$ (mm). The focus distance of the imaging optical system 101 is set as $f=14.0$ (mm), the F number is set as $F=2.9$, and the number of one-dimensional divided pupils is set as $N=3$. The number of pixels $R_{synth}$ of the combined image may be selected from three types of $8.0\times10^6$ pix, $5.2\times10^6$ pix, and $2.0\times10^6$ pix by the combined image pixel number designating unit 111a. The value of $d_{refocus}$ with respect to the respective number of pixels $R_{synth}$ is illustrated in Table 1. Here, since the number of pixels for each single-viewpoint image is set as $5.2\times10^6$ pix, there is a need to improve the revolution using the super-resolution by the pixel shift in order to generate the combined image of $8.0\times10^6$ pix. Further, the number of pixels of the combined image may be set as a value other than the above-described values, and the type thereof does not need to be three types. However, at this time, $d_{refocus}$ is determined so as to satisfy Expression (7).

The focus control range may be calculated from the image forming formula by using the image-side focus control range, the focus distance of the imaging optical system 101, the focus position, and the like. Further, the obtained focus control range may be recorded on the image recording medium 110 while being added as tag information to at least a part of the parallax image or the reconstruction image. Alternatively, a configuration may be employed in which a table of the focus control range for the image obtaining condition is stored in advance on the storage unit 109 and the corresponding data is read out instead of calculating the focus control range.

Further, as a method of obtaining the other focus control range, a method is considered in which the refocused combined image is generated actually and the contrast or the like of the object existing at the focus position is evaluated. However, in this method, since there is a need to sequentially determine whether the refocusing is performed by generating the combined image while moving the focus position, it takes some time for the processing. Further, in a case where the object does not exist at the refocusing focus position, the evaluation may not be performed, and hence the accurate focus control range may not be obtained. For this reason, it is desirable to use the above-described method when obtaining the focus control range.

Figure 12:
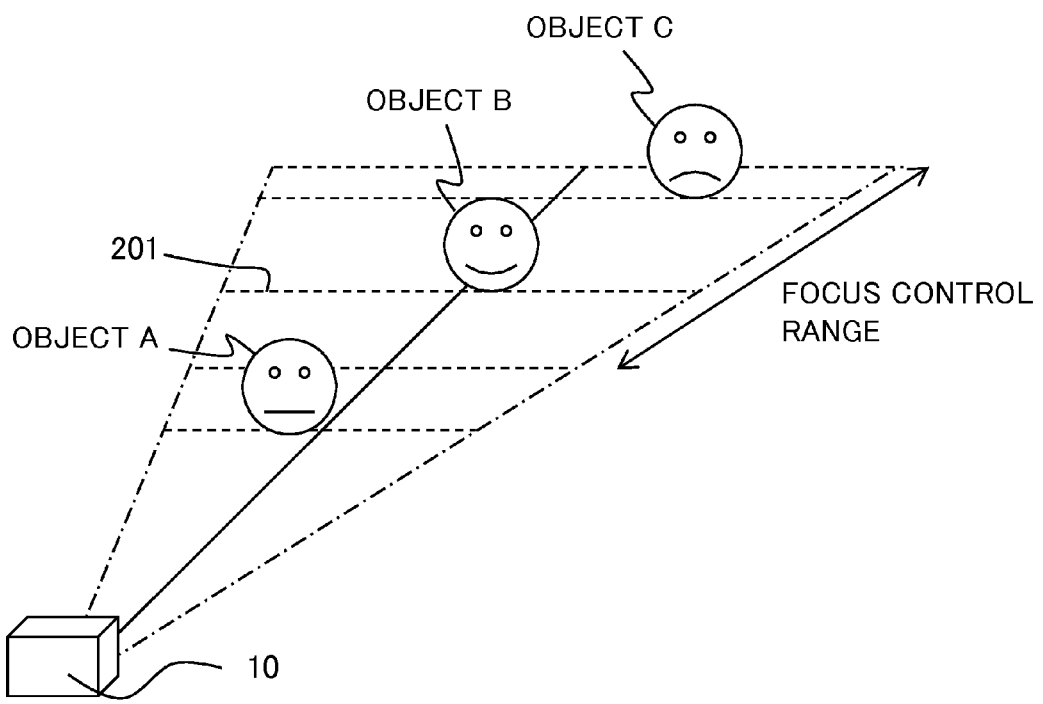
FIG. 12 is a diagram illustrating an example of a photographed scene in Embodiments 1 to 4.

Subsequently, in step S106 of FIG. 9, the image processing unit 105 marks the object positioned outside the focus control range obtained in step S105 from the single-viewpoint image. This marking will be described by referring to FIG. 12 and FIGS. 13A to 13E. FIG. 12 is a diagram illustrating an example of a photographed scene of the embodiment. Further, FIGS. 13A to 13E are explanatory diagrams illustrating the display images of the embodiment.

Figure 13A:
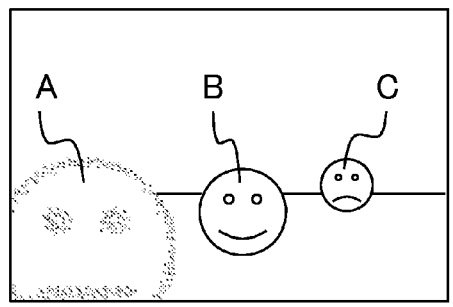
FIGS. 13A to 13E are explanatory diagrams illustrating display images in Embodiments 1 to 4.

For example, it is assumed that the object space illustrated in FIG. 12 is photographed. At this time, the single-viewpoint image which is generated from the obtained parallax image is illustrated in FIG. 13A. The photographing operation herein is performed in a manner such that the imaging optical system 101 focuses the object B. As illustrated in FIG. 12, the object C exists inside the focus control range, but the object A is positioned outside the focus control range. For example, when a case is supposed in which the pixel number ratios of the combined images and the single-viewpoint image are 1, the focus control range is approximately equal to the field depth of the single-viewpoint image. For this reason, in FIG. 13A, the object A existing outside the focus control range is blurred.

Figure 13B:
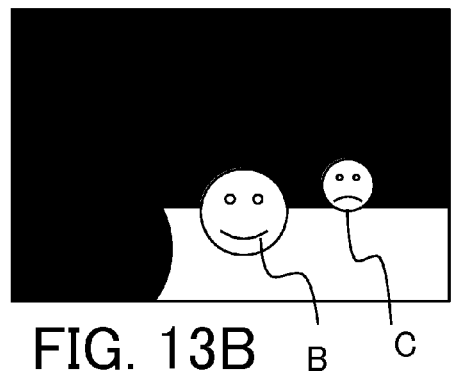
Figure 13C:
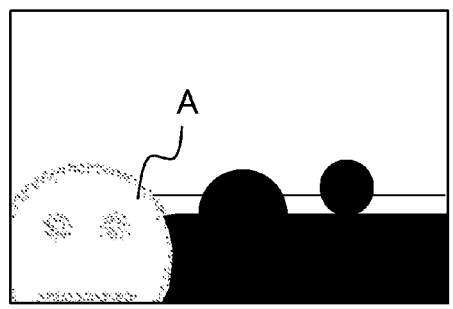
Figure 13D:
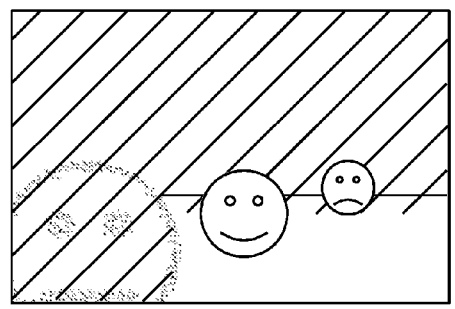

The image processing unit 105 extracts the object existing outside the focus control range by using the distance information of the object space obtained in step S104 of FIG. 9 from the image of FIG. 13A. The distance information may be obtained at the timing other than step S104 if the distance information is obtained before step S106. The images which are extracted in this way are FIGS. 13B and 13C. FIG. 13B illustrates the object existing inside the focus control range, and FIG. 13C illustrates the object existing outside the focus control range. A marking is performed on the extracted object by diagonal lines. However, the marking is not limited thereto, and may be performed in another method. For example, a coloring processing, a brightness correction processing, an extracted object flickering processing, or the like may be performed. Further, a processing of highlighting the edge of the extracted object may be performed. Further, regarding the image processing such as marking, the object inside the focus control range may be marked in an opposite manner since only a difference between the inside and the outside of the focus control range is enough as the image processing. Further, the image for extracting the object may be a reconstruction image.

Figure 13E:
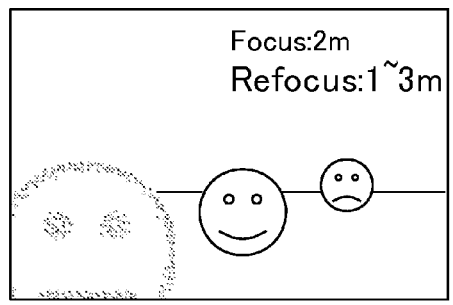

Subsequently, in step S107, the image processing unit 105 generates the display image on which the focus control range is displayed. That is, the image processing unit 105 generates the display image illustrated in FIG. 13D by combining the image outside the focus control range marked in step S106 and the image inside the focus control range. However, the display image may be generated by the other method as long as the focus control range is suggested to the user. For example, as illustrated in FIG. 13E, the focus control range obtained in step S105 may be numerically indicated within the display image. In this case, since there is no need to extract the object in step S106, the distance information is not needed, and hence the number of processes decreases.

Subsequently, in step S108, the image processing unit 105 outputs the display image to the display unit 106. A series of operations illustrated in FIG. 9 is performed at a predetermined interval while the parallax image is obtained by the image pickup element 103. Accordingly, the user may check the image that may be photographed by the image pickup apparatus 10 in real time.

Next, referring to FIG. 10, a case will be described in which the focus control range is suggested to the user when the image is edited after the photographing operation. Further, in FIG. 10, the description of the same points as those of FIG. 9 will not be repeated. First, in step S201, the image processing unit 105 obtains the parallax image photographed by the parallax image obtaining unit 100 or the parallax image recorded on the image recording medium 110. Subsequently, in step S202, as in step S104 of FIG. 9, the image processing unit 105 obtains the information for generating the display image representing the focus control range. Also, the image processing unit 105 obtains the reconstruction settings (the focus position, the F number, the viewpoint, and the like) of the image output to the display unit 106. However, the image processing unit 105 may generate an image by using a predetermined default value without obtaining the reconstruction settings.

Next, in step S203, the image processing unit 105 determines whether the display instruction of the display image is generated. When the display instruction is generated, the routine proceeds to step S205. Meanwhile, when the display instruction is not generated, the routine proceeds to step S204. In step S204, the image processing unit 105 generates the reconstruction image in accordance with the obtained reconstruction settings and outputs the reconstruction image to the display unit 106.

Subsequently, in step S205, the image processing unit 105 obtains the focus control range of the combined image. The method is the same as that of step S105 of FIG. 9. Subsequently, in step S206, the image processing unit 105 marks the object positioned outside the focus control range from the image (reconstruction image) that is reconstructed by the designed settings. Then, in step S207, the image processing unit 105 generates the display image representing the focus control range. The method in steps S206 and S207 is the same as that of steps S106 and S107 of FIG. 9.

Subsequently, in step S208, the image processing unit 105 outputs the display image to the display unit 106. Alternatively, the image processing unit 105 may store the display image on the image recording medium 110. Further, when the display instruction is generated after step S204, the process from step S205 may be started. At that time, in order to increase the processing speed, the display image may be generated before steps S205 to S207. Accordingly, it is possible to promptly output the display image when the display instruction is generated.

According to the embodiment, it is possible to provide the image pickup apparatus and the image pickup apparatus controlling method that allow the user to easily photograph a user's desired object or edit an image according to the intension of the user by suggesting the refocusing range to the user when the object is photographed or the image is edited.

[Embodiment 2]

Next, an image pickup apparatus of Embodiment 2 of the invention will be described. Since the basic configuration of the image pickup apparatus of the embodiment is the same as that of the image pickup apparatus 10 of Embodiment 1 described by referring to FIG. 1, the description thereof will not be repeated.

Figure 14:
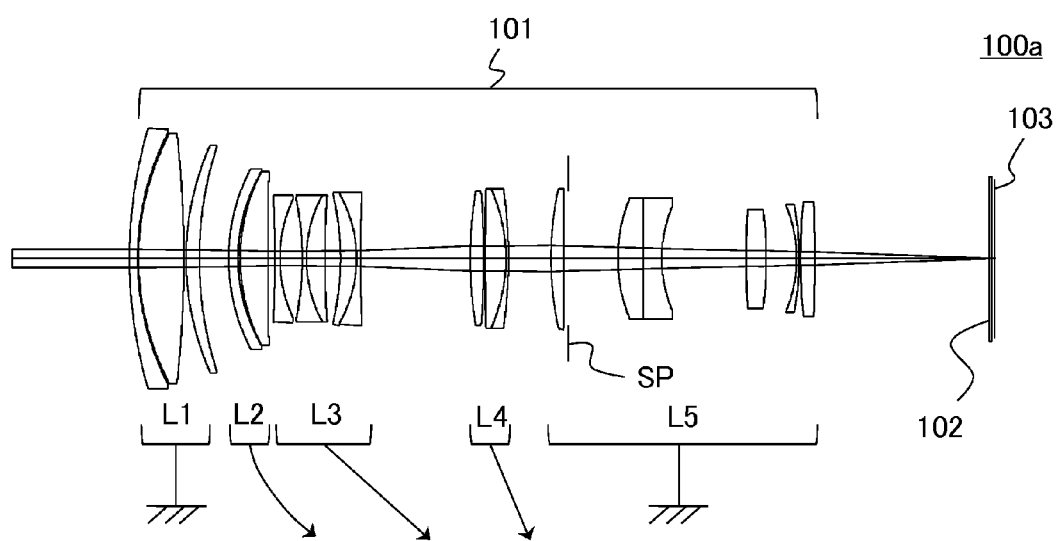
FIG. 14 is a cross-sectional view illustrating the parallax image obtaining unit of Embodiment 2.

Referring to FIGS. 3 and 14, the configuration of a parallax image obtaining unit 100a of the embodiment will be described. FIG. 3 is a schematic configuration diagram illustrating the parallax image obtaining unit 100a. FIG. 14 is a cross-sectional view illustrating the parallax image obtaining unit 100a. In FIG. 14, the imaging optical system 101 is a zoom lens. The imaging optical system 101 includes, in order from an object side, a first lens unit L1 having positive refractive power, a second lens unit L2 having positive refractive power, a third lens unit L3 having negative refractive power, a fourth lens unit L4 having positive refractive power, and a fifth lens unit L5 having positive refractive power. At the time of changing the magnification, the first lens unit L1 and the fifth lens unit L5 are fixed and the second lens unit L2, the third lens unit L3, and the fourth lens unit L4 move on the optical axis OA. When the focusing is performed, the second lens unit L2 is driven.

As illustrated in FIG. 3, the parallax image obtaining unit 100a includes, from an object side (object plane side), the imaging optical system 101, the lens array 102, and the image pickup element 103. The imaging optical system 101 forms an image on the image-side conjugate plane 202 of the beam coming from the object plane 201. The lens array 102 is disposed at the object side in relation to the image-side conjugate plane 202 with respect to the object plane 201 of the imaging optical system 101. Further, the image-side conjugate plane 202 and the image pickup element 103 are disposed so that the conjugate relation is satisfied through the lens array 102. In other words, the lens array 102 is disposed so that the image-side conjugate plane 202 and the image pickup element 103 have the conjugate relation. The beam coming from the object plane 201 passes through the imaging optical system 101 and the lens array 102, and is incident into different pixels of the image pickup element 103 in accordance with the angle and the position of the beam on the object plane 201, thereby obtaining the light field.

According to the configuration illustrated in FIG. 3, the image pickup element 103 obtains an image in which a plurality of small images having different photographing viewpoints and different photographing ranges are arranged in series. FIG. 4 is a schematic configuration diagram illustrating a different parallax image obtaining unit 100b of the embodiment. The configuration (parallax image obtaining unit 100b) illustrated in FIG. 4 is the same as the configuration (parallax image obtaining unit 100a) illustrated in FIG. 3 except that the lens array 102 is disposed at the image side in relation to the image-side conjugate plane 202. The parallax image obtaining unit 100b of FIG. 4 is different from the parallax image obtaining unit 100a of FIG. 3 in that the lens array 102 forms the image formed by the imaging optical system 101 as the actual object on the image pickup element 103 again. However, the configurations of FIGS. 3 and 4 are basically the same since the lens array 102 sees the image formed by the imaging optical system 101 as the object and forms the image on the image pickup element 103. For this reason, the discussion on the configuration of FIG. 3 is also the same as that on the configuration of FIG. 4.

Next, referring to FIGS. 15A and 15B, a method (refocus processing) of generating the refocusing image of the embodiment will be described. The refocus processing of the embodiment is qualitatively the same as that of Embodiment 1, and the images of the divided pupils of the imaging optical system 101 may be superimposed on (overlapped with) one another by the shift amount corresponding to the in-focusing object distance.

Figure 15A:
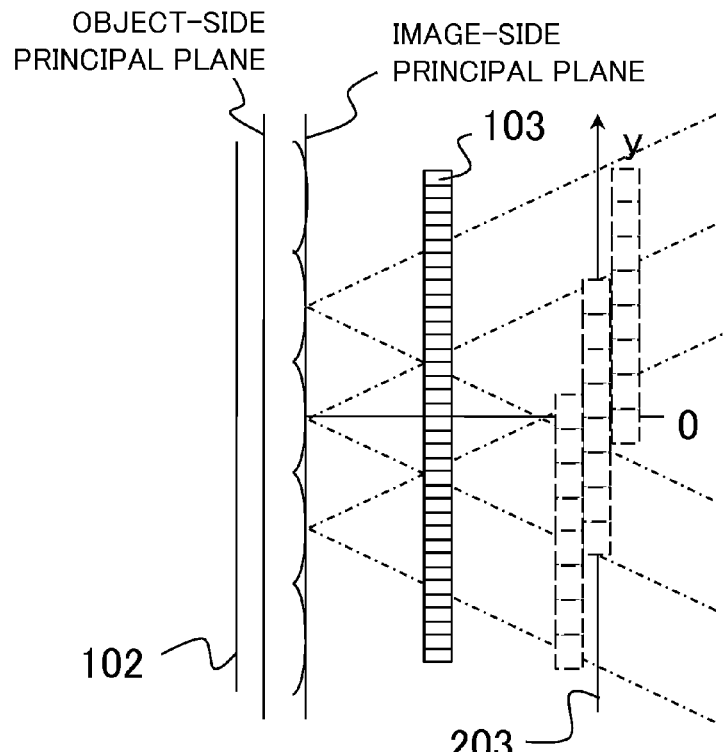
FIGS. 15A and 15B are explanatory diagrams illustrating the generation of a refocusing image of Embodiment 2.
Figure 15B:
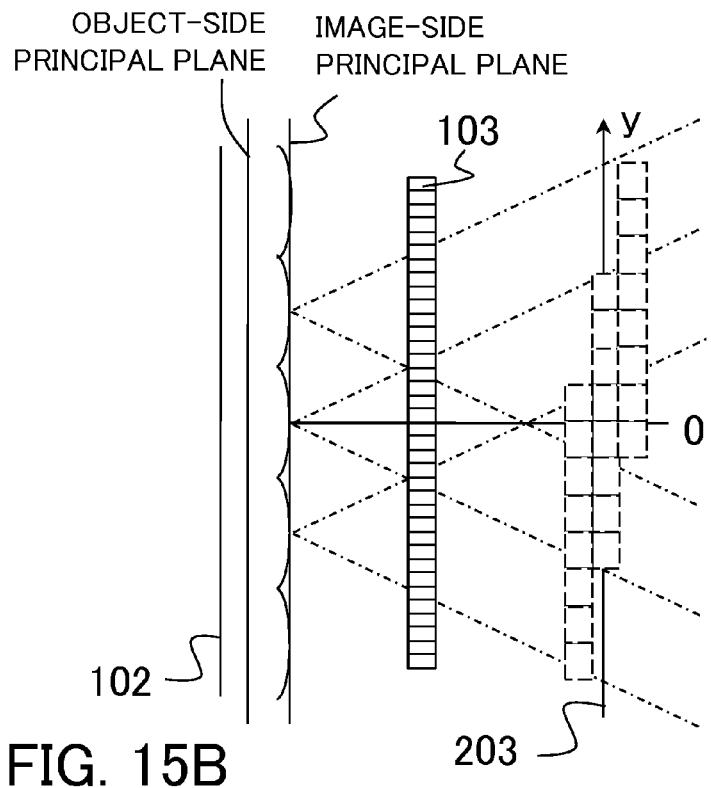

FIGS. 15A and 15B are diagrams specifically illustrating the lens array 102 and the image pickup element 103 in the configuration of the imaging optical system illustrated in FIG. 3. In the embodiment, the lens array 102 has a configuration in which the object-side plane is formed as a flat plane and the image-side plane is formed by the convex small lens. However, like Embodiment 1, the shape of the lens array 102 is not limited thereto.

The one-dotted chain line of FIGS. 15A and 15B indicates the viewing angles of the respective small lenses. When the pixel values which are obtained by the image pickup element 103 are combined while being projected onto the imaginary image forming plane 203 through the small lenses corresponding to the pixels, the refocusing image focused on the imaginary image forming plane 203 may be generated. Here, the imaginary image forming plane 203 indicates the object-side plane to be focused by the refocusing and the conjugate plane through the imaging optical system 101. For example, in order to generate the image focused on the object plane 201 of FIG. 3, the imaginary image forming plane 203 may be formed on the image-side conjugate plane 202. In FIGS. 15A and 15B, the pixels which are projected when generating the refocusing image are depicted by the dashed line, and are depicted while being offset from one another so that the pixels may be easily understood. The refocusing image may be generated by the above-described method of projecting the pixels and the method of combining the respective pixels while being moved horizontally so that the same pixels are superimposed one another. At this time, when the regions of the lens array 102 through which the beam incident to the pixels pass are the same, the horizontal movement amounts of the pixels are the same. In this state, the operation of the pixel when generating the refocusing image in the configurations of FIGS. 3 and 4 is determined in accordance with the region of the lens array 102 through which the beam incident to the pixel passes.

Figure 16:
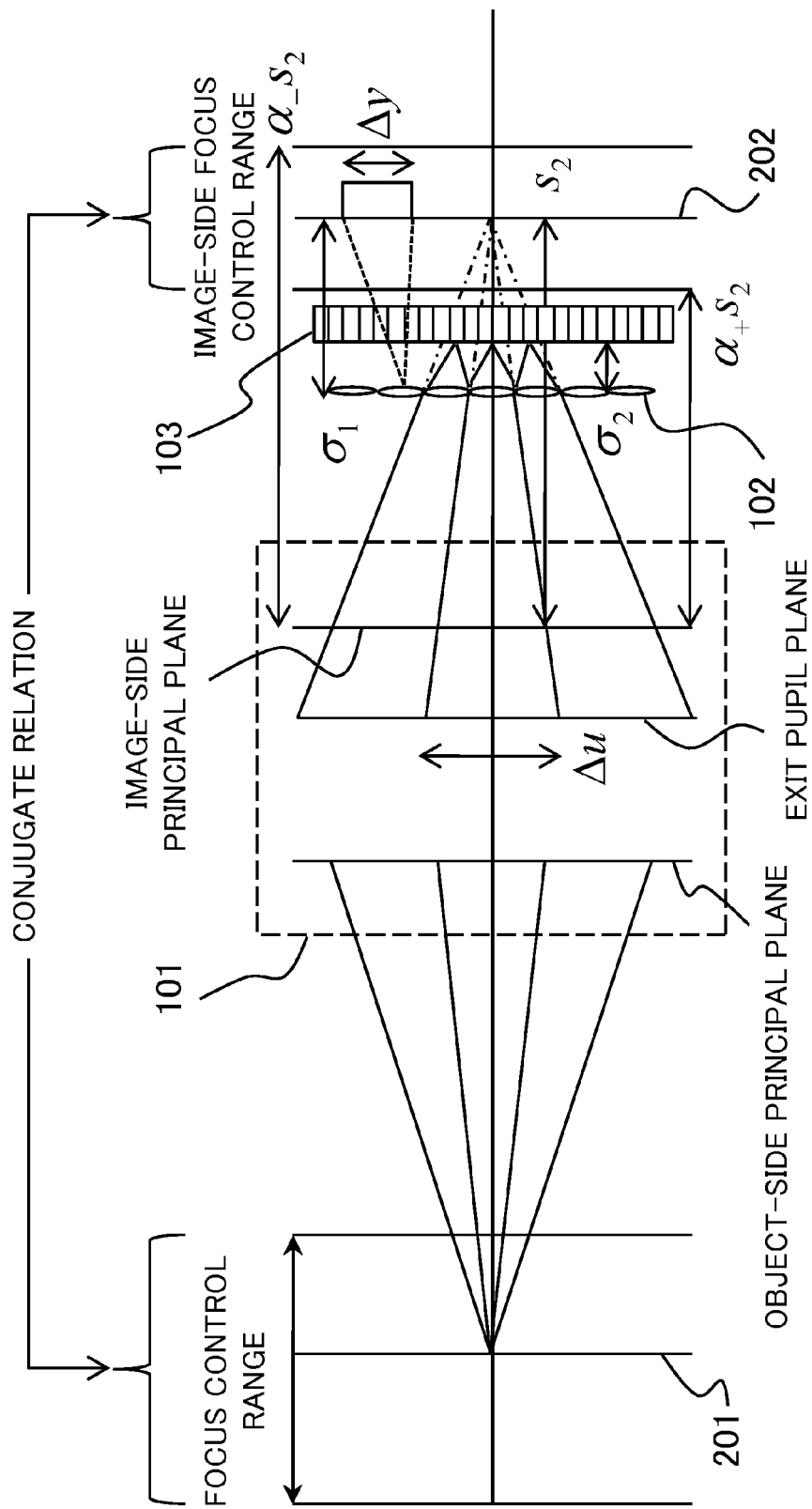
FIG. 16 is an explanatory diagram illustrating a focus control range of Embodiment 2.

Next, referring to FIG. 16, the refocusable range (refocusing range) will be described. FIG. 16 is an explanatory diagram illustrating the refocusing range (focus control range) of the embodiment. Even the refocusing range of the embodiment is expressed as Expression (1) like Embodiment 1, and the relation thereof is illustrated in FIG. 16.

$\Delta y$ of FIG. 16 indicates the sampling pitch of the two-dimensional intensity distribution of the beam in FIGS. 3 and 4, and the relation of $\Delta y = \Delta\sigma_1/\sigma_2$ is established. This is because the image formed by the imaging optical system 101 is seen as the imaginary object and is formed on the image pickup element 103 while being decreased in sized by $\sigma_2/\sigma_1$ times. Here, $\sigma_1$ indicates the distance between the image-side conjugate plane 202 and the object-side principal plane of the lens array 102, and $\sigma_2$ indicates the distance between the image-side principal plane of the lens array 102 and the image pickup element 103. Even in the embodiment, since the condition of $\Delta \ll P$ is established, Expression (1) may be approximated like Expression (2).

Since the method of generating the display image when photographing the object or editing the image in the embodiment is illustrated as the flowcharts of FIGS. 9 and 10, the description of the same points as those of Embodiment 1 will not be repeated.

In step S105 of FIG. 9, the image processing unit 105 obtains the focus control range of the combined image. At this time, the image processing unit 105 calculates the image-side focus control range by the same concept as that of Embodiment 1. From FIG. 16, the relation of $NF=\sigma_1/\Delta_{LA}$ is geometrically established. Further, since the relation of $\Delta y = \Delta\sigma_1/\sigma_2$ is established as described above, Expression (8) below is established.

$$R_{mono} = \left(\frac{\sigma_2}{\sigma_1}\right)^2 R_{total} \qquad (8)$$

By using these relations, Expression (9) below as the condition to be satisfied by $d_{refocus}$ is obtained.

$$0.0 < \frac{\Delta_{LA} d_{refocus}}{\Delta \sigma_1} \sqrt{\frac{R_{synth}}{R_{total}}} \leq 10.0 \qquad (9)$$

The meanings of the upper limit and the lower limit of Expression (9) are the same as those of Expression (7).

Desirably, the sharper combined image may be obtained by setting the image-side focus control range within the range of Expression (9a) below.

$$0.0 < \frac{\Delta_{LA} d_{refocus}}{\Delta \sigma_1} \sqrt{\frac{R_{synth}}{R_{total}}} \leq 6.0 \qquad (9a)$$

Desirably, the sharper combined image may be obtained by setting the image-side focus control range within the range of Expression (9b) below.

$$0.0 < \frac{\Delta_{LA} d_{refocus}}{\Delta \sigma_1} \sqrt{\frac{R_{synth}}{R_{total}}} \leq 3.0 \qquad (9b)$$

The value of Expression (9) of the embodiment is illustrated in Table 1. In the embodiment, the number of effective pixels of the image pickup element 103 is set as $R_{total}=150.0\times10^6$ (pix). Further, the relation of $\sigma_1=0.3712$ (mm) and $\sigma_2=0.0740$ (mm) is set. The pixel pitch of the image pickup element 103 is set as $\Delta=0.0024$ (mm), and the pitch of the lens array 102 is set as $\Delta_{LA}=0.0256$ (mm). The focus distance of the wide angle end of the imaging optical system 101 is set as $f_W=72.2$ (mm), and the focus distance at the telephoto end is set as $f_T=194.0$ (mm). The F number from the wide angle end to the telephoto end is set as F=2.9, and the number of one-dimensional divided pupils is set as N=5. The number of pixels $R_{synth}$ of the combined image may be selected from three types of $10.0\times10^6$ pix, $6.0\times10^6$ pix, and $3.0\times10^6$ pix by the combined image pixel number designating unit 111a. $d_{refocus}$ for each number of pixels is illustrated in Table 1. Here, since the number of pixels for each single-viewpoint image is set as $6.0\times10^6$ pix, there is a need to improve the revolution using the super-resolution by the pixel shift in order to generate the combined image of $10.0\times10^6$ pix. Furthermore, even in step S205 of FIG. 10, the focus control range may be obtained according to the same procedure like step S105 of FIG. 9.

According to the embodiment, it is possible to provide the image pickup apparatus and the image pickup apparatus controlling method that allow the user to easily photograph a user's desired object or edit an image according to the intension of the user by suggesting the refocusing range to the user when the object is photographed or the image is edited.

[Embodiment 3]

Next, an image pickup apparatus of Embodiment 3 of the invention will be described. Since the basic configuration of the image pickup apparatus of the embodiment is the same as that of the image pickup apparatus 10 of Embodiment 1 described by referring to FIG. 1, the description thereof will not be repeated.

Figure 17:
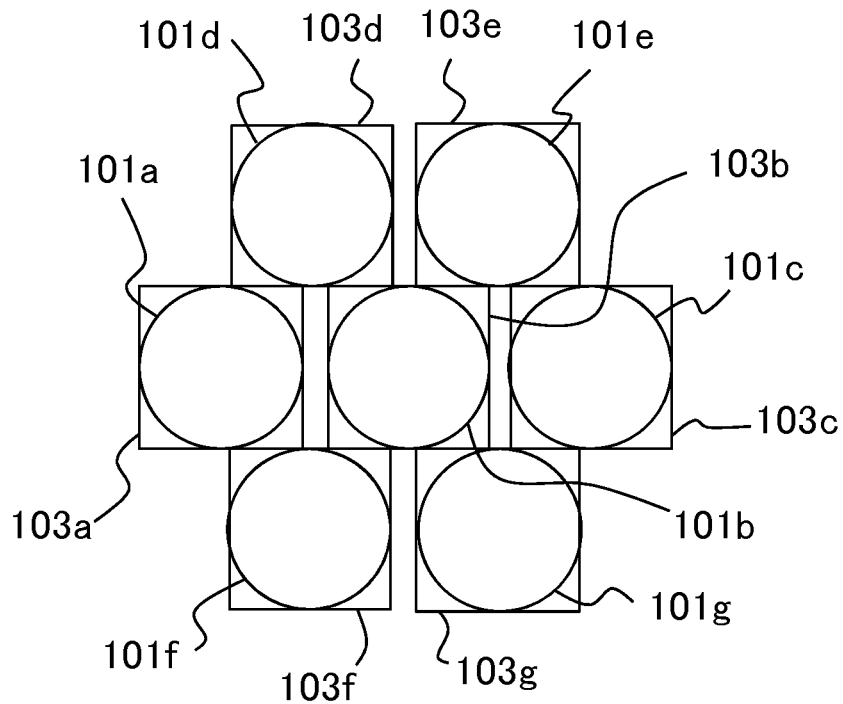
FIG. 17 is a cross-sectional view illustrating the parallax image obtaining unit of Embodiment 3 when viewed from an object side.

Referring to FIGS. 5 and 17, the configuration of a parallax image obtaining unit 100c of the embodiment will be described. FIG. 5 is a schematic configuration diagram illustrating the parallax image obtaining unit 100c. FIG. 17 is a cross-sectional view obtained when the parallax image obtaining unit 100c is viewed from the object side.

In FIG. 5, the parallax image obtaining unit 100c includes, from an object side (object plane side), a plurality of imaging optical systems 101a to 101c and a plurality of image pickup elements 103a to 103c. The plurality of imaging optical systems 101a to 101c are formed so that an image is formed on the image-side conjugate plane of the beam coming from the object space, and are disposed in two dimensions. Further, the plurality of image pickup elements 103a to 103c respectively include a plurality of pixels. However, the embodiment is not limited thereto, and one image pickup element including a plurality of pixels may be used.

As illustrated in FIG. 7, the parallax image obtaining unit 100c includes six-fold symmetry by the rotary axis of the optical axis of the imaging optical system 101b. However, the embodiment is not limited thereto, and the number or the arrangement of the imaging optical systems may be appropriately changed. The image pickup elements 103a to 103g are respectively disposed at the image side of the imaging optical systems 101a to 101g. However, the image pickup element may not be provided as plural number, and when the image formed by the imaging optical systems 101a to 101g may not be obtained, a single image pickup element may be used. The beams which are refracted by the imaging optical systems 101a to 101g are respectively received by the corresponding image pickup elements 103a to 103g. The plurality of images which are obtained by the image pickup elements 103a to 103g become the parallax image which is obtained by observing the object space from different viewpoints. By combining these plural images, the light field of the object space may be obtained.

Figure 18:
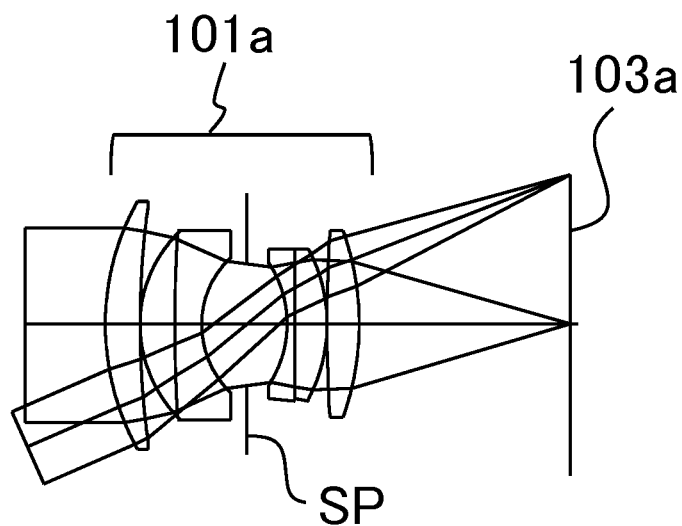
FIG. 18 is a cross-sectional view illustrating an imaging optical system of Embodiment 3.

FIG. 18 is a cross-sectional view illustrating the imaging optical system 101a (and the image pickup element 103a) of the embodiment. Since the cross-sectional views of the other imaging optical systems 101b to 101g and the image pickup elements 103b to 103g are the same, the description thereof will not be repeated. However, the respective imaging optical systems may have different configurations. The imaging optical system 101a of FIG. 18 is a single focus lens, and is equipped with an aperture SP. By changing the distance between the imaging optical system 101a and the image pickup element 103a, the focusing operation is performed.

Figure 19:
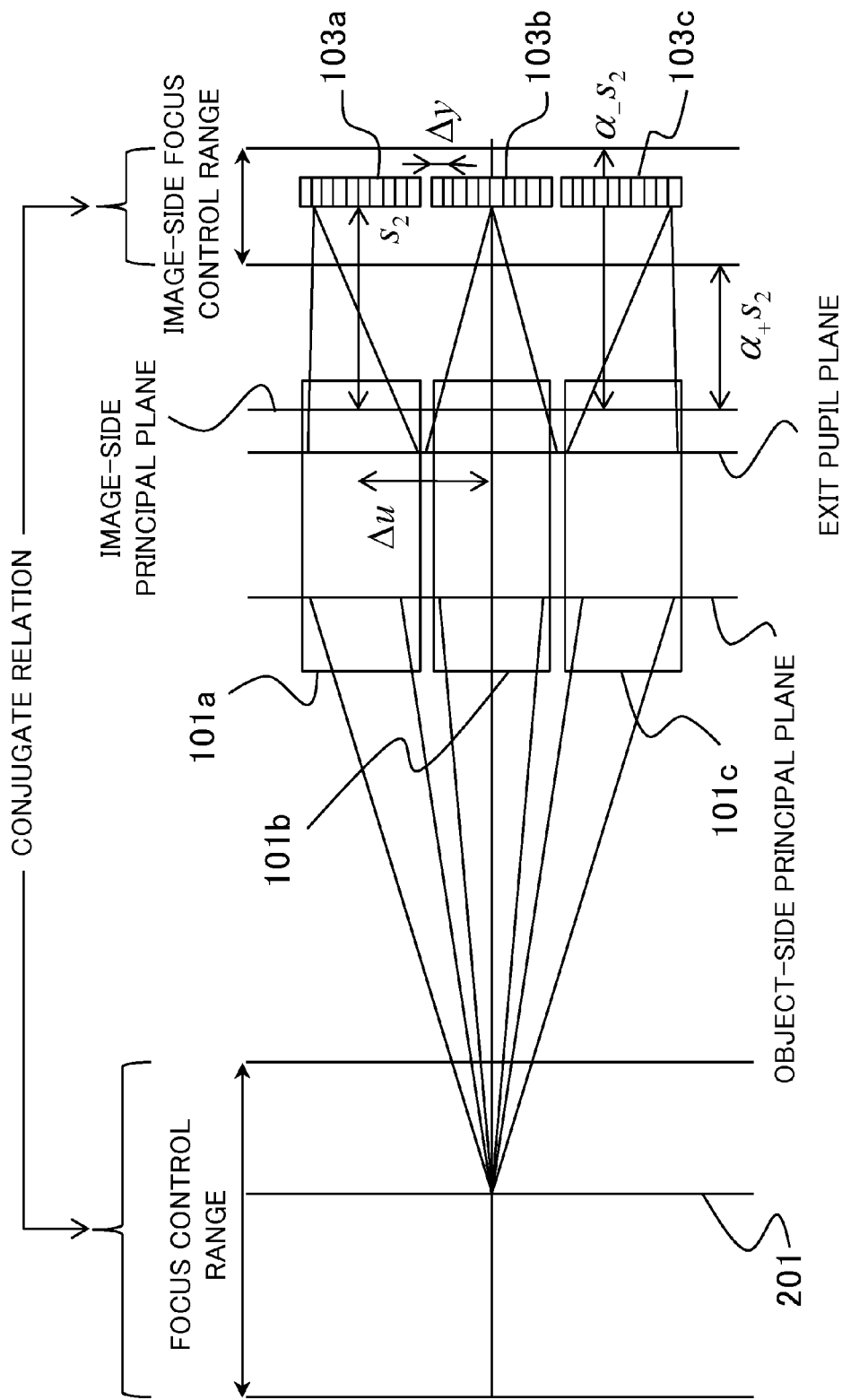
FIG. 19 is an explanatory diagram illustrating a focus control range of Embodiment 3.

Next, referring to FIG. 19, the refocusable range (refocusing range) will be described. FIG. 19 is an explanatory diagram illustrating the refocusing range (focus control range) of the embodiment. Even the refocusing range of the embodiment is expressed by Expression (1) as in Embodiment 1, and the relation is illustrated in FIG. 19.

In the embodiment, the relation of $\Delta y = \Delta$ and $\Delta u = P_{mono}/F_{mono}$ is established. Here, $F_{mono}$ indicates the F number of one of the imaging optical systems 101a to 101g, and $P_{mono}$ indicates the exit pupil distance of the imaging optical system. Since the condition of $\Delta \ll P_{mono}$ is established, Expression (1) may be approximated to Expression (10) below.

$$\alpha_{\pm} s_2 = s_2 \mp F_{mono} \Delta y = s_2 \mp F_{mono} \Delta \qquad (10)$$

Since the method of generating the display image when photographing the object or editing the image of the embodiment is illustrated as the flowcharts of FIGS. 9 and 10, the description of the same points as those of Embodiment 1 will not be repeated. In step S104 of FIG. 9, the image processing unit 105 obtains the information necessary for obtaining the focus control range. The plurality of imaging optical systems 101a to 101g constituting the parallax image obtaining unit 100c of the embodiment respectively include an opening aperture of which the aperture value may be changed. The image processing unit 105 obtains the respective aperture values of the imaging optical systems 101a to 101g for the photographing operation predicted by the exposure state predicting unit 113 based on the information of the photometry unit 112 as the prediction of the exposure state. The prediction of the exposure state may be performed by the signals respectively obtained from the image pickup elements 103a to 103g. Further, the image processing unit 105 obtains the respective vignetting information items of the imaging optical systems 101a to 101g as the image obtaining condition. In the imaging optical systems 101a to 101g illustrated in FIG. 18, the beam is shaded as the viewing angle becomes higher, and hence the valid F number increases. In this way, since the focal depth becomes different in accordance with the viewing angle, the image processing unit 105 individually calculates the focus control range of each viewing angle from the vignetting information in step S105.

Subsequently, in step S105 of FIG. 9, the image processing unit 105 obtains the focus control range of the combined image. At this time, the image processing unit 105 calculates the image-side focus control range by the same concept as that of Embodiment 1. That is, the image processing unit 105 obtains the focus control range by applying the F numbers of the imaging optical systems 101a to 101g for the photographing operation obtained by the prediction of the exposure state to $F_{mono}$. When the number of pixels of the image formed by the imaging optical system having the F number of $F_{mono}$ in the imaging optical systems 101a to 101g is denoted by $R_{mono}$ Expression (11) as the condition to be satisfied by $d_{refocus}$ is obtained.

$$0.0 < \frac{d_{refocus}}{F_{mono}\Delta}\sqrt{\frac{R_{synth}}{R_{mono}}} \leq 10.0 \quad (11)$$

The meanings of the upper limit and the lower limit of Expression (11) are the same as those of Expression (7).

Desirably, the sharper combined image may be obtained by setting the image-side focus control range within the range of Expression (11a) below.

$$0.0 < \frac{d_{refocus}}{F_{mono}\Delta}\sqrt{\frac{R_{synth}}{R_{mono}}} \leq 6.0 \quad (11a)$$

Desirably, the sharper combined image may be obtained by setting the image-side focus control range within the range of Expression (11b) below.

$$0.0 < \frac{d_{refocus}}{F_{mono}\Delta}\sqrt{\frac{R_{synth}}{R_{mono}}} \leq 3.0 \quad (11b)$$

The value of Expression (11) as the conditional expression of the embodiment is illustrated in Table 1. The respective numbers of effective pixels of the image pickup elements 103a to 103g are set as $R_{mono}=19.3\times10^6$ (pix), and the pixel pitch is set as $\Delta=0.0012$ (mm). The respective focus distances of the imaging optical systems 101a to 101g are set as f=50.0 (mm), and the open F number is set as F=1.8. In Table 1, the F number for the photographing operation is set as $F_{mono}=1.8$. When the F number is different, $d_{refocus}$ is determined so as to satisfy Expression (11). Further, in the region of the high viewing angle, the focus control range is changed in accordance with the vignetting of the beam. For example, when the focal depth of a certain viewing angle region of the image is two times the focal depth of the on-axis region, the focus control range of the viewing angle region is set two times the focus control range on the axis. The number of pixels $R_{synth}$ of the combined image may be selected from three types of $19.3\times10^6$ pix, $10.0\times10^6$ pix, and $5.0\times10^6$ pix by the combined image pixel number designating unit 111a. $d_{refocus}$ for each number of pixels is illustrated in Table 1. Furthermore, even in steps S202 and S205 of FIG. 10, the information and the focus control range may be obtained according to the same procedure as that of steps S104 and S105 of FIG. 9.

According to the embodiment, it is possible to provide the image pickup apparatus and the image pickup apparatus controlling method that allow the user to easily photograph a user's desired object or edit an image according to the intension of the user by suggesting the refocusing range to the user when the object is photographed or the image is edited.

[Embodiment 4]

Figure 20:
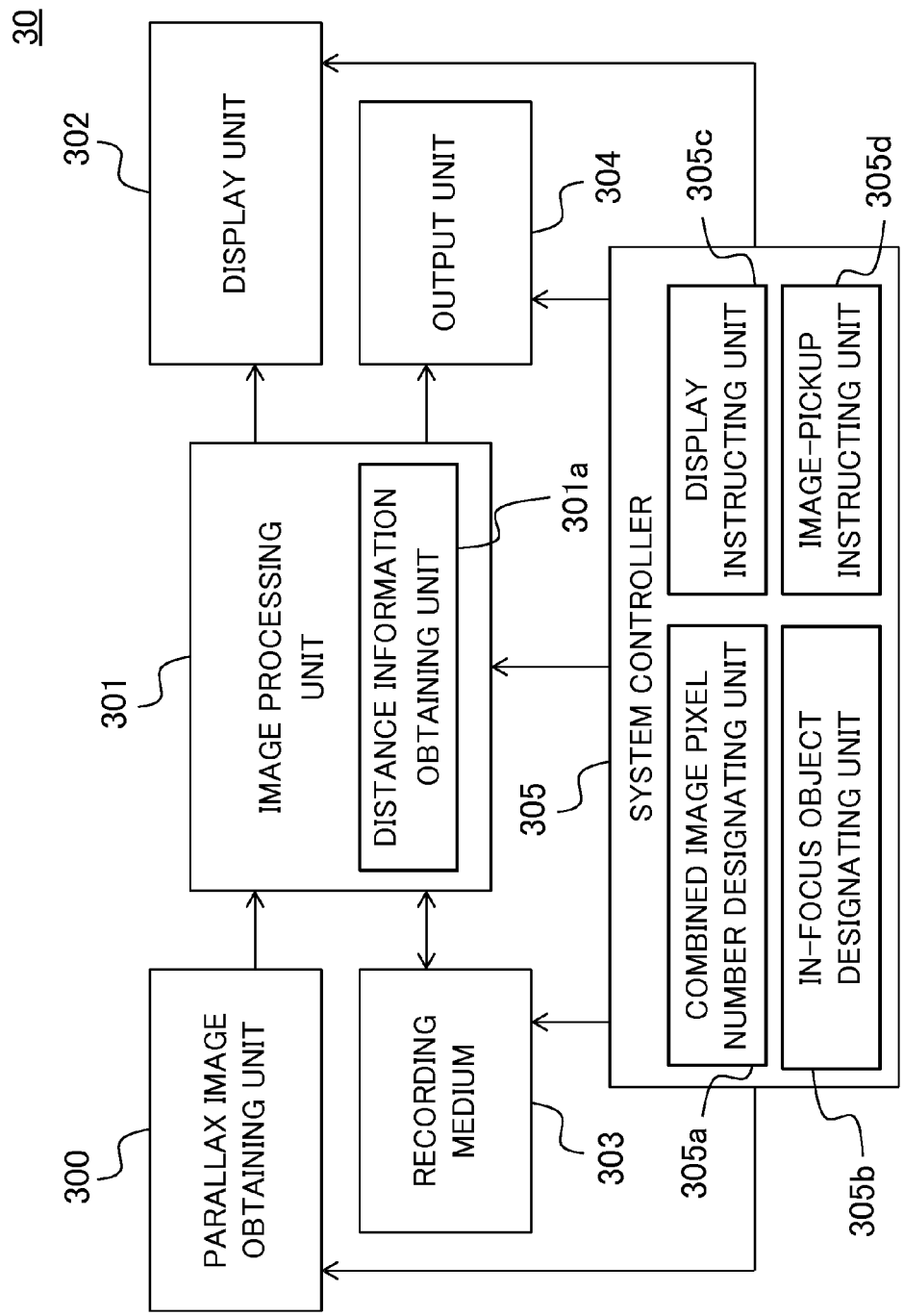
FIG. 20 is a block diagram illustrating an image pickup apparatus (image pickup system) of Embodiment 4.
Figure 21:
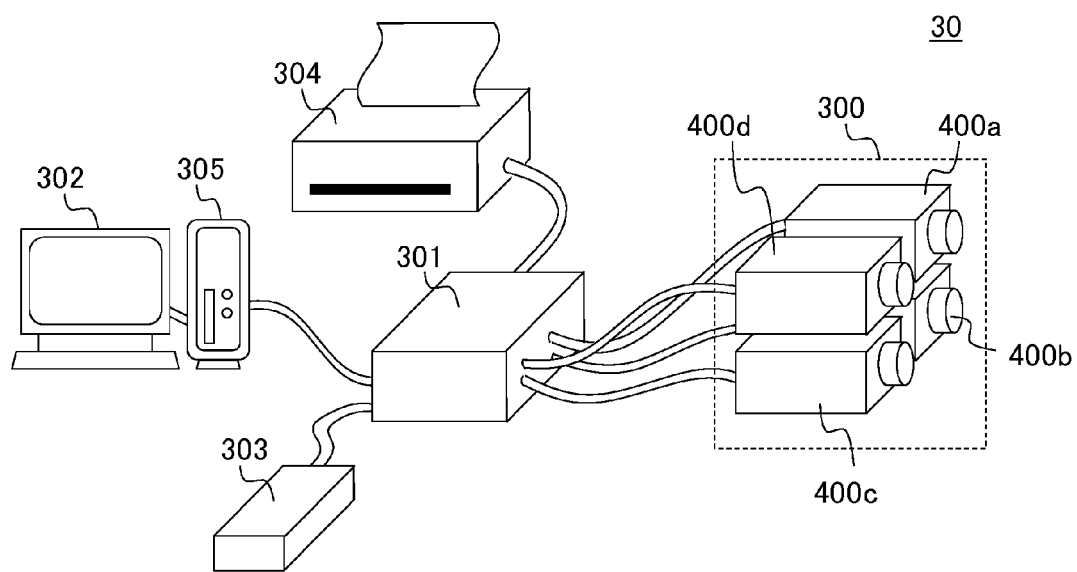
FIG. 21 is a schematic configuration diagram illustrating the image pickup apparatus (image pickup system) of Embodiment 4.

Next, referring to FIGS. 20 to 23, an image pickup apparatus (image pickup system) of Embodiment 4 of the invention will be described. FIG. 20 is a block diagram illustrating an image pickup apparatus (image pickup system) 30 of the embodiment. FIG. 21 is a schematic configuration diagram illustrating the image pickup apparatus 30.

As illustrated in FIG. 21, a parallax image obtaining unit (input image obtaining device) 300 includes four single-viewpoint image obtaining units 400a to 400d which are arranged in two dimensions, and is qualitatively the same as that of Embodiment 3 described by referring to FIG. 5. An image processing unit (image processing device) 301 is a computer (image processing device) that performs the process illustrated in the flowcharts of FIGS. 9 and 10. The image which is processed by the image processing unit 301 is output to any one or some of a display unit (display device) 302, a recording medium (storage unit) 303, and an output unit (output device) 304. The display unit (display device) 302 is, for example, a liquid crystal display or a projector. The recording medium 303 is, for example, a semiconductor memory, a hard disk, a server on a network, or the like. The output unit 304 is a printer or the like.

The user may perform an operation while checking the image through the display unit 302 when photographing the object or editing the image. The image processing unit 301 performs a developing processing or the other image processings if necessary in addition to the processing or the reconstruction processing of FIGS. 9 and 10. The control of the respective components is performed by a system controller 305 such as PC. The system controller 305 includes a combined image pixel number designating unit 305a, an in-focus object designating unit 305b, a display instructing unit 305c, and an image-pickup instructing unit 305d.

Figure 22:
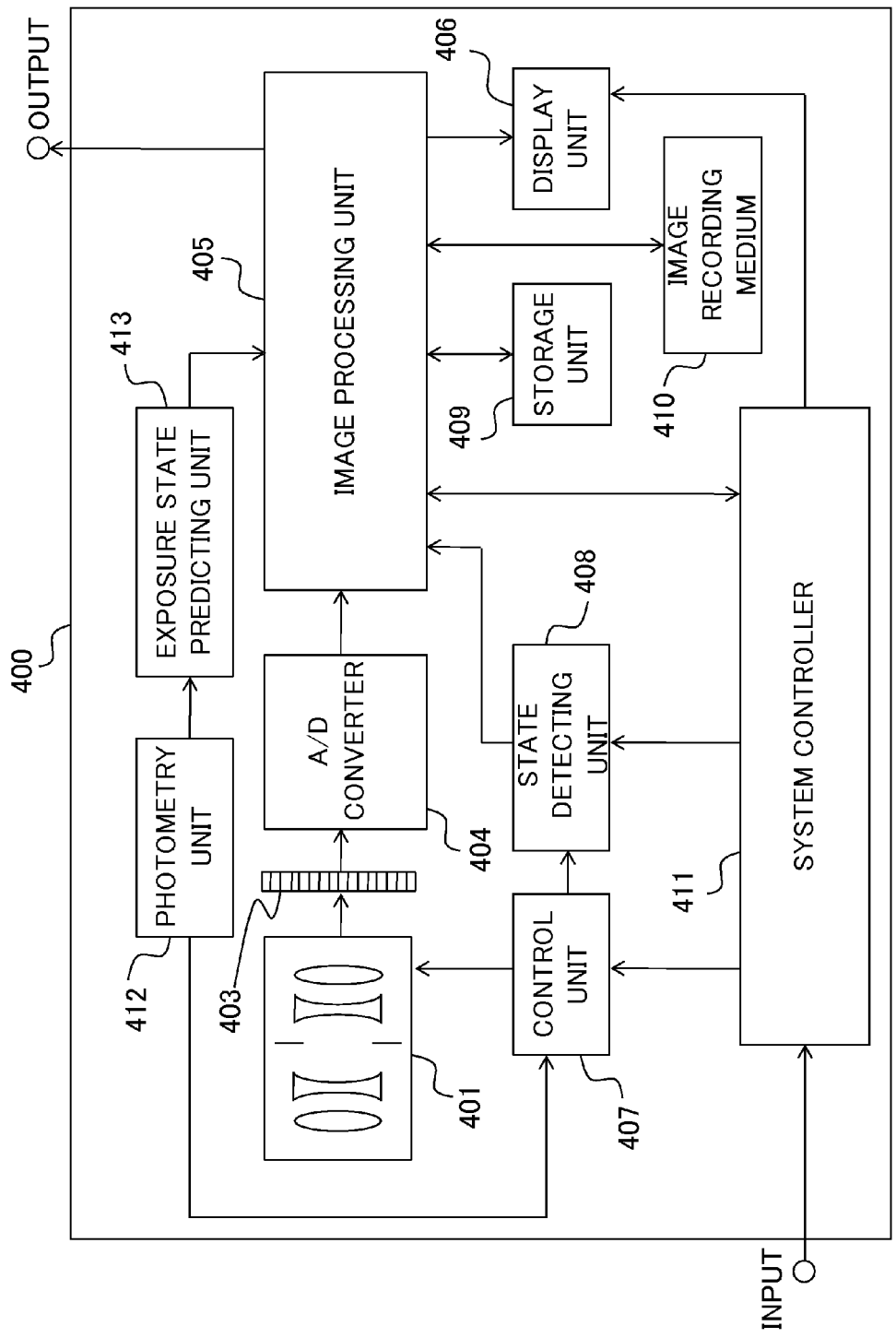
FIG. 22 is a block diagram illustrating a single-viewpoint image obtaining unit of Embodiment 4.

Subsequently, referring to FIG. 22, the respective configurations of the single-viewpoint image obtaining units 400a to 400d will be described. FIG. 22 is a block diagram illustrating a single-viewpoint image obtaining unit 400. In FIG. 22, the description of the same points as those of FIG. 1 will not be repeated.

The image which is formed by the imaging optical system 401 is converted into a digital signal by an image pickup element 403 and an A/D converter 404. The digital signal is subjected to a predetermined processing by an image processing unit 405, and is output to the respective units (a display unit 406, a storage unit 409, and an image recording medium (image recording unit) 410) inside the single-viewpoint image obtaining unit 400 and the image processing unit 301. The system controller 411 controls the respective units (a control unit 407, a state detecting unit 408, an image processing unit 405, and a display unit 406) of the single-viewpoint image obtaining unit 400 by receiving the signal from the system controller 305. An exposure state predicting unit 413 predicts the exposure state for the photographing operation based on the information obtained from the photometry unit 412.

Figure 23:
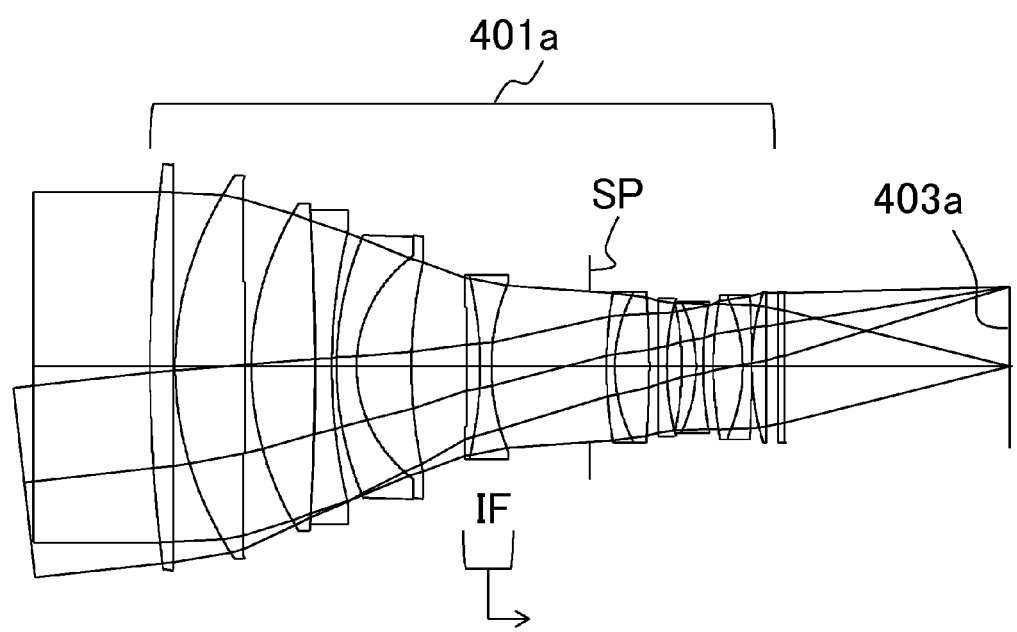
FIG. 23 is a cross-sectional view illustrating an imaging optical system of Embodiment 4.

FIG. 23 is a cross-sectional view illustrating an imaging optical system 401a (and an image pickup element 403a) of the embodiment. The imaging optical system 401a illustrated in FIG. 23 is a single focus lens having a focus group IF and an aperture SP, and the focusing is performed by driving the focus group IF. Even the other single-viewpoint image obtaining units 400b to 400d have the same configurations as that of the single-viewpoint image obtaining unit 400a. However, the respective single-viewpoint image obtaining units may have different configurations, and the number or the arrangement thereof is not limited.

The generating of the display image when photographing the object or editing the image and the refocus processing of the embodiment are the same as those of Embodiment 3. Further, the value of Expression (11) of the embodiment is illustrated in Table 1. The number of effective pixels of each of the image pickup element 403a to 403d of the embodiment is set as $R_{mono}=32.0\times 10^6$ (pix), and the pixel pitch is set as $\Delta=0.0052$ (mm). The focus distance of each of the imaging optical systems 401a to 401d is set as f=200.0 (mm), and the open F number is set as F=2.0. Table 1 indicates the value obtained by setting the F number predicted for the photographing operation as $F_{mono}=2.0$. The number of pixels $R_{synth}$ of the combined image may be selected from three types of $64.0\times 10^6$ pix, $32.0\times 10^6$ pix, and $8.0\times 10^6$ pix by the combined image pixel number designating unit 305a. $d_{refocus}$ for each number of pixels is illustrated in Table 1. Here, there is a need to enhance the resolution by using the super-resolution by the pixel shift in order to generate the combined image of $64.0\times 10^6$ pix.

Furthermore, in a case where the embodiment is applied to the image processing device, the image processing device may include a storage unit which stores the photographing condition information of the input image (parallax image).

According to the embodiment, it is possible to provide the image pickup system and the image processing device that allow the user to easily photograph a user's desired object or edit an image according to the intension of the user by suggesting the refocusing range to the user when the object is photographed or the image is edited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

TABLE 1

| | | | | |
|---|---|---|---|---|
| EMBODIMENT 1 | $R_{total}$ (Pix) 46.7 × 10⁶ | σ (mm) 0.0374 | | |
| | $R_{synth}$ (pix) | $d_{refocus}$ (mm) | CONDITIONAL EXPRESSION (7) | |
| | 8.0 × 10⁶ | 0.2260 | 2.5 | |
| | 5.2 × 10⁶ | 0.6166 | 5.5 | |
| | 2.0 × 10⁶ | 1.7174 | 9.5 | |
| EMBODIMENT 2 | $R_{total}$ (pix) 150.0 × 10⁶ | Δ (mm) 0.0024 | $\Delta_{LA}$ (mm) 0.0256 | $\sigma_1$ (mm) 0.3712 |
| | $R_{synth}$ (pix) | $d_{refocus}$ (mm) | CONDITIONAL EXPRESSION (9) | |
| | 10.0 × 10⁶ | 1.3208 | 9.8 | |
| | 6.0 × 10⁶ | 0.9918 | 5.7 | |
| | 3.0 × 10⁶ | 0.6398 | 2.6 | |
| EMBODIMENT 3 | $R_{mono}$ (pix) 19.3 × 10⁶ | Δ (mm) 0.0012 | $F_{mono}$ 1.8 | |
| | $R_{synth}$ (pix) | $d_{refocus}$ (mm) | CONDITIONAL EXPRESSION (11) | |
| | 19.3 × 10⁶ | 0.0060 | 2.8 | |
| | 10.0 × 10⁶ | 0.0171 | 5.7 | |
| | 5.0 × 10⁶ | 0.0407 | 9.6 | |
| EMBODIMENT 4 | $R_{mono}$ (pix) 32.0 × 10⁶ | Δ (mm) 0.0052 | $F_{mono}$ 2.0 | |
| | $R_{synth}$ (pix) | $d_{refocus}$ (mm) | CONDITIONAL EXPRESSION (11) | |
| | 64.0 × 10⁶ | 0.0162 | 2.2 | |
| | 32.0 × 10⁶ | 0.0187 | 1.8 | |
| | 8.0 × 10⁶ | 0.0249 | 1.2 | |

This application claims the benefit of Japanese Patent Application No. 2012-200093, filed on Sep. 12, 2012, which is hereby incorporated by reference herein in its entirety.

What is claimed is:

1. An image pickup apparatus capable of generating a plurality of output images having different focus positions by performing refocus processing on an input image containing light field information, the image pickup apparatus comprising:
   an input image obtaining unit configured to obtain the input image by performing a first photographing operation and a second photographing operation;
   an image processing unit configured to generate a display image from the input image; and
   a display unit configured to display the display image,
   wherein the image processing unit is configured to obtain a refocus range in which a focus position is controllable, and generate the display image including information on the refocus range by using at least a part of an input image obtained by performing the first photographing operation, and
   wherein an edge of each object included in the refocus range of the display image is highlighted by performing highlighting processing on the edge after performing the first photographing operation and before performing the second photographing operation.

2. The image pickup apparatus according to claim 1,
   wherein the input image is a parallax image which is obtained by photographing an object space from a plurality of viewpoints, and
   wherein the output image is a combined image which is obtained by performing a refocus processing on the parallax image.

3. The image pickup apparatus according to claim 1,
   wherein the image processing unit is configured to change the refocus range in accordance with an image obtaining condition of the input image obtaining unit.

4. The image pickup apparatus according to claim 3,
wherein the image processing unit is configured to change the refocus range in accordance with an angle of view region of the input image.

5. The image pickup apparatus according to claim 1,
wherein the image processing unit is configured to change the refocus range in accordance with the number of pixels of the output image.

6. The image pickup apparatus according to claim 5, further comprising a pixel number designating unit configured to designate the number of pixels of the output image.

7. The image pickup apparatus according to claim 1,
wherein the display unit is configured to display the display image before a photographing operation.

8. The image pickup apparatus according to claim 1, further comprising:
a distance information obtaining unit configured to obtain distance information of an object space,
wherein the image processing unit is configured to generate the display image by using the distance information.

9. The image pickup apparatus according to claim 8,
wherein the distance information obtaining unit is configured to obtain the distance information by using parallax information of the input image.

10. The image pickup apparatus according to claim 1,
wherein the image processing unit is configured to generate the display image by performing different image processings inside and outside the refocus range.

11. The image pickup apparatus according to claim 1, further comprising a display instructing unit configured to instruct a display of the display image to the display unit.

12. The image pickup apparatus according to claim 1, further comprising an in-focus object designating unit configured to designate an object to be focused,
wherein the image processing unit is configured to generate the display image after the object to be focused is designated.

13. The image pickup apparatus according to claim 1, further comprising an image recording unit configured to record an image as the output image or at least a part of the input image,
wherein the image recording unit is configured to record the image and the refocus range corresponding to the image.

14. The image pickup apparatus according to claim 1, further comprising an exposure state predicting unit configured to previously predict an exposure state during a photographing operation,
wherein the image processing unit is configured to change the refocus range in accordance with the exposure state previously predicted.

15. The image pickup apparatus according to claim 1,
wherein the input image obtaining unit includes, from an object side, an imaging optical system configured to form an image of a beam from an object plane on an image-side conjugate plane, a lens array disposed on the image-side conjugate plane, and an image pickup element including a plurality of pixels,
wherein the lens array is configured to cause a beam coming from the same position of the object plane to enter the different pixels of the image pickup element in accordance with a pupil region of the imaging optical system through which the beam passes, and
wherein when an image-side range conjugate to the refocus range via the imaging optical system is set as an image-side refocus range, the following expression is satisfied:

$$0.0 < \frac{d_{refocus}}{\sigma} \sqrt{\frac{R_{synth}}{R_{total}}} \leq 10.0$$

where $d_{refocus}$ indicates a distance between the image-side conjugate plane and one of both ends of the image-side refocus range, $\sigma$ indicates a distance between an image-side principal plane of the lens array and the image pickup element, $R_{synth}$ indicates the number of pixels of the output image, and $R_{total}$ indicates the number of effective pixels of the image pickup element.

16. The image pickup apparatus according to claim 1,
wherein the input image obtaining unit includes, from an object side, an imaging optical system configured to form an image of a beam from an object plane on an image-side conjugate plane, a lens array, and an image pickup element including a plurality of pixels,
wherein the lens array is disposed so that the image-side conjugate plane and the image pickup element have a conjugate relation, and is configured to cause a beam coming from the same position of the object plane to enter the different pixels of the image pickup element in accordance with a pupil region of the imaging optical system through which the beam passes, and
wherein when an image-side range conjugate to the refocus range via the imaging optical system is set as an image-side refocus range, the following expression is satisfied:

$$0.0 < \frac{\Delta_{LA} d_{refocus}}{\Delta \sigma_1} \sqrt{\frac{R_{synth}}{R_{total}}} \leq 10.0$$

where $d_{refocus}$ indicates a distance between the image-side conjugate plane and one of both ends of the image-side refocus range, $\sigma_1$ indicates a distance between an image-side principal plane of the lens array and the image-side conjugate plane, $\Delta_{LA}$ indicates a pitch of the lens array, $\Delta$ indicates a pixel pitch of the image pickup element, $R_{synth}$ indicates the number of pixels of the output image, and $R_{total}$ indicates the number of effective pixels of the image pickup element.

17. The image pickup apparatus according to claim 1,
wherein the input image obtaining unit includes, from an object side, a plurality of imaging optical systems forming an image of a beam from an object space on an image-side conjugate plane and at least one image pickup element including a plurality of pixels,
wherein the plurality of imaging optical systems are arranged in two dimensions, and
wherein when an image-side range conjugate to the refocus range via the imaging optical system is set as an image-side refocus range, the following expression is satisfied:

$$0.0 < \frac{d_{refocus}}{F_{mono} \Delta} \sqrt{\frac{R_{synth}}{R_{mono}}} \leq 10.0$$

where $d_{refocus}$ indicates a distance between the image-side conjugate plane and one of both ends of the image-side refocus range, $F_{mono}$ indicates an F number of the imaging optical system, $\Delta$ indicates a pitch of the pixels of the image pickup element, $R_{synth}$ indicates the number of pixels of the output image, and $R_{mono}$ indicates the number of pixels of an image formed by the imaging optical system using the F number as $F_{mono}$.

18. The image pickup apparatus according to claim 1, wherein the light information is a two-dimensional intensity distribution of a beam in an object space and angle information of the beam.

19. The image pickup apparatus according to claim 1, wherein the image processing unit is configured to obtain the refocus range by using information relating to an image obtaining condition of the input image.

20. The image pickup apparatus according to claim 19, wherein the information relating to the image obtaining condition of the input image is information relating to at least one of a state of an aperture, a focus position, and a focal distance determined when the input image is obtained.

21. An image pickup system capable of generating a plurality of output images having different focus positions by performing refocus processing on an input image containing light field information, the image pickup system comprising:
   an input image obtaining device configured to obtain an input image by performing a first photographing operation and a second photographing operation;
   an image processing device configured to generate a display image from the input image; and
   a display device configured to display the display image,
   wherein the image processing device is configured to obtain a refocus range in which the focus position is controllable,
   wherein the image processing device is configured to generate the display image including information on the refocus range by using at least a part of an input image obtained by performing the first photographing operation, and
   wherein an edge of each object included in the refocus range of the display image is highlighted by performing highlighting processing on the edge after performing the first photographing operation and before performing the second photographing operation.

22. An image processing device capable of generating a plurality of output images having different focus positions by performing refocus processing on an input image containing light field information, the image processing device comprising:
   a storage unit configured to store image pickup condition information of an input image,
   an image processing unit configured to generate a display image from the input image by performing a first photographing operation and a second photographing operation; and
   a display unit configured to display the display image,
   wherein the image processing unit is configured to obtain a refocus range in which the focus position is controllable, and generate the display image including information on the refocus range by using at least a part of an input image obtained by performing the first photographing operation, and
   wherein an edge of each object included in the refocus range of the display image is highlighted by performing highlighting processing on the edge after performing the first photographing operation and before performing the second photographing operation.

23. A method of controlling an image pickup apparatus capable of generating a plurality of output images having different focus positions by performing refocus processing on an input image containing light field information, the method comprising the steps of:
   obtaining an input image by performing a first photographing operation and a second photographing operation via an imaging optical system and an image pickup element,
   obtaining a refocus range in which the focus position is controllable;
   generating a display image including information on the refocus range by using at least a part of an input image obtained by performing the first photographing operation; and
   displaying the display image on a display unit,
   wherein an edge of each object included in the refocus range of the display image is highlighted by performing highlighting processing on the edge after performing the first photographing operation and before performing the second photographing operation.

* * * * *